United States Patent
Otsuka et al.

(10) Patent No.: US 7,440,899 B2
(45) Date of Patent: Oct. 21, 2008

(54) PHONETIC-SOUND PROVIDING SYSTEM, SERVER, CLIENT MACHINE, INFORMATION-PROVISION MANAGING SERVER AND PHONETIC-SOUND PROVIDING METHOD

(75) Inventors: Nobuyuki Otsuka, Kawanishi (JP); Kiyoshi Morimoto, Hirakata (JP); Yuka Yamada, Nara (JP); Hiroshi Kutsumi, Moriguchi (JP); Nobuo Kitao, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 481 days.

(21) Appl. No.: 10/793,863

(22) Filed: Mar. 8, 2004

(65) Prior Publication Data

US 2004/0172248 A1    Sep. 2, 2004

Related U.S. Application Data

(63) Continuation of application No. PCT/JP03/04266, filed on Apr. 3, 2003.

(30) Foreign Application Priority Data

Apr. 9, 2002    (JP)    ............................. 2002-106165

(51) Int. Cl.
G10L 21/00    (2006.01)
(52) U.S. Cl. ................................. 704/270.1
(58) Field of Classification Search ................ 704/254, 704/270.1; 715/705, 706
See application file for complete search history.

(56) References Cited

U.S. PATENT DOCUMENTS

| | | | | |
|---|---|---|---|---|
| 5,673,362 A | * | 9/1997 | Matsumoto | .................. 704/260 |
| 5,983,190 A | * | 11/1999 | Trower et al. | ................. 704/276 |
| 6,112,176 A | * | 8/2000 | Goldenthal et al. | ......... 704/257 |
| 6,147,692 A | * | 11/2000 | Shaw et al. | .................. 345/643 |
| 6,181,351 B1 | * | 1/2001 | Merrill et al. | ............... 345/473 |

(Continued)

FOREIGN PATENT DOCUMENTS

JP    9-131468    5/1997

(Continued)

OTHER PUBLICATIONS

"Structured audio: creation, transmission, and rendering of parametric sound representations", Vercoe, B.L.; Gardner, W.G.; Scheirer, E.D.;Proceedings of the IEEE vol. 86, Issue 5, May 1998 pp. 922-940.*

(Continued)

*Primary Examiner*—Michael N Opsasnick
(74) *Attorney, Agent, or Firm*—Wenderoth, Lind & Ponack, L.L.P.

(57) ABSTRACT

A server, which transmits phonetic-sound information to a plurality of client machines and reproduces the transmitted phonetic-sound information, includes a storage unit for storing a plurality of pieces of voiced phonetic-sound information whose contents are voices of a plurality of speakers in a conversation made up of the voices of the plurality of speakers. The server also includes a timing determining unit for determining reproduction timing of the plurality of pieces of voiced phonetic-sound information, and a transmitting unit for transmitting the voiced phonetic-sound information which is applicable to each client machine, so that its reproduction is executed in the reproduction timing determined by the timing determining unit.

11 Claims, 9 Drawing Sheets

U.S. PATENT DOCUMENTS

| | | | |
|---|---|---|---|
| 6,249,720 B1 | 6/2001 | Kubota et al. | |
| 6,268,872 B1* | 7/2001 | Matsuda et al. | 345/473 |
| 6,320,583 B1* | 11/2001 | Shaw et al. | 345/619 |
| 6,339,832 B1* | 1/2002 | Bowman-Amuah | 714/35 |
| 6,408,270 B1* | 6/2002 | Garber | 704/251 |
| 6,513,006 B2* | 1/2003 | Howard et al. | 704/257 |
| 6,539,354 B1* | 3/2003 | Sutton et al. | 704/260 |
| 6,625,576 B2* | 9/2003 | Kochanski et al. | 704/260 |
| 6,721,416 B1* | 4/2004 | Farrell | 379/265.07 |
| 6,766,299 B1* | 7/2004 | Bellomo et al. | 704/276 |
| 6,963,839 B1* | 11/2005 | Ostermann et al. | 704/260 |
| 7,043,530 B2 | 5/2006 | Isaacs et al. | |
| 7,203,648 B1* | 4/2007 | Ostermann et al. | 704/260 |
| 2002/0007304 A1 | 1/2002 | Kasajima et al. | |
| 2002/0008716 A1* | 1/2002 | Colburn et al. | 345/706 |
| 2002/0052913 A1 | 5/2002 | Yamada et al. | |

FOREIGN PATENT DOCUMENTS

| | | |
|---|---|---|
| JP | 9-153145 | 6/1997 |
| JP | 11-259271 | 9/1999 |
| JP | 2001-256036 | 9/2001 |
| JP | 2002-82748 | 3/2002 |
| JP | 2003-114692 | 4/2003 |

OTHER PUBLICATIONS

Speech and language technologies for audio indexing and retrieval□□Makhoul, J.; Kubala, F.; Leek, T.; Daben Liu; Long Nguyen; Schwartz, R.; Srivastava, A.;□□Proceedings of the IEEE□□vol. 88, Issue 8, Aug. 2000 pp. 1338-1353□□.*

Creating conversational interfaces for children□□Narayanan, S.; Potamianos, A.;□□Speech and Audio Processing, IEEE Transactions on□□vol. 10, Issue 2, Feb. 2002 pp. 65-78□□.*

Multilevel scripting for responsive multimedia□□Agamanolis, S.; Bove, V.M., Jr.;□□Multimedia, IEEE□□vol. 4, Issue 4, Oct.-Dec. 1997 pp. 40-50□□.*

Real-time animation of realistic virtual humans□□Kalra, P.; Magnenat-Thalmann, N.; Moccozet, L.; Sannier, G.; Aubel, A.; Thalmann, D.;□□Computer Graphics and Applications, IEEE□□vol. 18, Issue 5, Sep.-Oct. 1998 pp. 42-56□□.*

Issues in accessing Web sites from mobile devices□□Tilley, S.; Toeter, B.; Wong, K;□□Web Site Evolution, 2001. Proceedings. 3rd International Workshop on□□Nov. 10, 2001 pp. 97-104.*

Talking heads and synthetic speech: an architecture for supporting electronic commerce□□Ostermann, J.; Millen, D.;□□Multimedia and Expo, 2000. ICME 2000. 2000 IEEE International Conference on□□vol. 1, Jul. 30-Aug. 2, 2000 pp. 71-74 vol. 1□□.*

Kosuke Takano et al., "A Semantic Associative Search Method with a Context Recognition Function for Measuring Directional Relationships", DBSJ Letters vol. 4, No. 4, pp. 1-4.

Chris Buckley et al., "Automatic Routing and Retrieval Using Smart: TREC-2", Information Processing and Management, vol. 31, No. 3, pp. 315-326, 1995.

Masaki Murata et al. "Using the Diff Command in Patent Documents", Proceedings of the Third NTCIR Workshop, Sep. 2001-Oct. 2002, 2003 National Institute of Informatics.

Yasushi Kiyoki et al., "A Metadatabase System for Semantic Image Search by A Mathematical Model of Meaning", SIGMOD Record, vol. 23, No. 4, Dec. 1994, pp. 34-41.

"Manzai", obtained from the website of "Wikipedia", May 11, 2007.

* cited by examiner

PHONETIC-SOUND PROVIDING SYSTEM, SERVER, CLIENT MACHINE, INFORMATION-PROVISION MANAGING SERVER AND PHONETIC-SOUND PROVIDING METHOD

This is a continuation of International Application PCT/JP03/04266 with an international filing date of Apr. 3, 2003.

BACKGROUND OF THE INVENTION

1. Field of the Invention

This invention relates to a system where a person receives information indirectly from a conversation between client machines which are realized using a household electrical appliance or the like, a phonetic-sound providing system which extracts information on a person's response to a conversation between the client machines to collect individual preference information, and its method.

2. Description of the Related Art

A conventional information displaying system with a data delaying function is disclosed in Japanese Patent Laid-Open No. 2000-348095 specification (hereinafter, referred to as Publication 1). The system described in Publication 1 is an information displaying system in which a server unit receives information on the market price from a center unit and delays transmitting, to a client machine, the information which meets a specific requirement among the received pieces of information, until a specific time. This is an information providing system in which among the pieces of market-price information received from the server unit, a display of the information whose real time does not need displaying is put off until a specific time. This helps lower a rate for information and running costs.

Japanese Patent Laid-Open No. 2001-243284 specification discloses an interest and preference analyzing system and a market-research method, in which on the Internet, information on a user's interest and preference is collected one after another for researches on the market.

Japanese Patent Laid-Open No. 2001-188787 specification discloses a conversation processing unit and a conversation processing method, in which a user is provided with a pleasant natural conversation, using a computer.

The configuration of the system described in Publication 1 will be described with reference to FIG. 1. This information displaying system is configured by a server unit 1 which receives data from a center unit (not shown) and transmits it over a LAN, and a plurality of client machines 2 which are connected to the server unit 1 via the LAN and receive and display the data transmitted from the server unit 1. Herein, the server unit 1 manages delayed-display information, i.e., whether each piece of data transmitted from the center unit is dealt with as a real-time display or as a delayed display. It provides this delayed-display information to an information providing company.

The server unit 1 is made up of: a reception portion 11 which receives data through a communication circuit from the center unit; a control portion 12 which divides the transmitted data into real-time display data and delayed display data and outputs them; a delay portion 13 which stocks the delayed display data for a certain period of time and outputs it; a stock portion 14 which stocks data to be transmitted; and a transmission portion 15 which transmits the data stocked in the stock portion 14.

Next, an operation of the system described in Publication 1 will be described. The control portion 12 divides the transmitted data into real-time display data and delayed display data, which are to be displayed in the client machine 2. It memorizes, in its memory area such as a work memory, a delay condition which is a criterion for identifying the delayed display data. Specifically, if the control portion 12 inputs the data received in the reception portion 11, it judges whether or not the data is data which meets the delay condition (or the delayed display data). If it is the delayed display data, the control portion 12 outputs it to the delay portion 13. On the other hand, if it is not the delayed display data, it outputs the data to the stock portion 14. The delay condition prescribes the delayed display data, and herein, a specific exchange is set as the delayed display data. Hence, the display of data which includes the exchange is delayed, but the other pieces of data are displayed at a real time.

A delay period of time is predetermined, which shows the time until which the display is delayed of the delayed display data to be inputted in the stock portion 14. According to an input on a user's delay condition and delay period of time from an operation portion (not shown), the delay condition and delay period of time may be memorized in the control portion 12. In that case, the delay portion 13 is operated after the delay period of time has passed which is set in the control portion 12. A user can set the delay condition and delay time at the user's option in the server unit 1, enabling the user to meet his own needs and delay a display. The time during which the stock portion 14 holds the delayed display data is a delay time which is predetermined by an operation from the operation portion. It is usually set to a time that would not take any information rates charged by an exchange (e.g., 20 minutes in this system).

In addition, the server unit 1 manages delayed-display information, i.e., whether each piece of data is real-time display data or delayed display data. It provides this information to an information providing company.

In an information displaying unit according to another embodiment of Publication 1, a server unit is united with a client machine. The server unit itself reproduces data received from a communication circuit and displays an image. Herein, the server unit is made up of a reception portion, a control portion, a delay portion, a stock portion and a display portion. The display portion is provided, instead of the transmission portion 15 of the information displaying system shown in FIG. 1. In addition, the server unit and the client machine are not connected via the LAN, which is different from the above described server unit 1. The control portion allows the delay condition and delay period of time to correspond to each user name (or an identification number for each user), and then, it memorizes them. This enables a display to be delayed according to the user. The delay condition is memorized in the control portion of the information displaying unit which makes a delayed display according to the user.

Either of the above described information displaying system and unit is characterized by delaying specific predetermined data for a certain period of time and displaying it. In other words, in the information displaying unit according to the above described prior art, received information on company shares or the like is sent to the client machine after a predetermined time (e.g., a delay time of 20 minutes) has passed. This enables a user to be exempted from information on an exchange in his use of the service. Accordingly, in the conventional information displaying unit, the delay time is fixed, and thus, a judgment has only been made whether it should be delayed when transmitted.

Thus, in the conventional information displaying system, the server unit could not transmit, to each of the plurality of client machines, a conversation file whose contents are voices which make up a conversation, and then, the plurality of client machines could not reproduce the received conversation file so that the plurality of client machines could have a conversation or the like with each other.

In other words, the conversation files transmitted to the plurality of client machines differ in reproduction time from each other. Therefore, it is essential to coordinate the reproduction timing of the conversation files so that the conversation files can be reproduced in the timing when the client machines have a conversation. In such a conventional information displaying system in which processing is conducted for a fixed delay time, it has been impossible to reproduce the received conversation file so that the plurality of client machines can have a conversation or the like with each other.

Especially, if each client machine has a different ghost so that a phonetic sound which has a different intonation can be reproduced, the time when the conversation file is reproduced in each client machine is different, even though it has the same contents. Therefore, if the reproduction timing of the conversation files is coordinated using a predetermined delay time in the conventional way, the conversation files cannot be reproduced so that a conversation is formed in good timing. Herein, the "ghost" is data on a character including a fictitious character. For example, "SHIORI" or the like is a typical code name of the ghost. A program which is the core of a client machine loaded with the ghost is called a "main body". It conducts processing of a script used for describing the source data of a sentence which is displayed in a "balloon" and also conducts something else. Herein, the "balloon" is a space for displaying a character's lines which are displayed on a display portion of equipment. As a typical code name of the "main body", for example, there are "something", etc.

The prior arts have the function of providing information to a user, but they don't have functions, such as taking a following action based on the user's response to the provided information, or allowing each client machine to hold the background of a conversation in common over a network and reproducing a conversation file as if ghosts are having the conversation with each other.

Furthermore, if a phonetic-sound information is produced synchronously with picture-image information, the phonetic-sound information had to be reproduced by coordinating its reproduction timing and the reproduction timing of the picture-image information. According to the above described prior arts, information is merely uniformly displayed, in other words, those prior arts do not provide methods such as displaying information synchronously with the picture-image information.

Furthermore, according to the above described prior arts, information is only provided, in other words, the prior arts do not show a system which provides information in consideration of user feedback for the provided information.

SUMMARY OF INVENTION

It is an object of the present invention to provide a phonetic-sound providing system, a server, a client machine, an information-provision managing server and an information providing method, which is capable of easily coordinating the reproduction timing of conversation information and reproducing the conversation information as if client machines are having a conversation with each other.

In a phonetic-sound providing system according to the present invention, which provides a phonetic sound to a user by allowing a plurality of client machines connected communicably to a server to reproduce phonetic-sound information distributed from the server, the server stores a plurality of pieces of voiced phonetic-sound information whose contents are respective voices of a plurality of speakers in a conversation made up of the voices of the plurality of speakers, determines reproduction timing of each piece of the voiced phonetic-sound information, and transmits, from among the plurality of pieces of voiced phonetic-sound information, the voiced phonetic-sound information which corresponds to each client machine; and the client machines reproduce the transmitted voiced phonetic-sound information in the reproduction timing determined by the server.

A server according to the present invention, which transmits phonetic-sound information to a plurality of client machines that are communicably connected thereto and reproduces the transmitted phonetic-sound information, comprises: a storage means for storing a plurality of pieces of voiced phonetic-sound information whose contents are voices of a plurality of speakers in a conversation made up of the voices of the plurality of speakers; a timing determining means for determining reproduction timing of the plurality of pieces of voiced phonetic-sound information; and a transmitting means for transmitting the voiced phonetic-sound information reproduced in the reproduction timing by the client machines, to the client machines which are applicable thereto.

Furthermore, in the server according to the present invention, the storage means stores the plurality of pieces of voiced phonetic-sound information whose contents being suitable to the fictitious character of each client machines, and the transmitting means transmits the voiced phonetic-sound information to the client machines which have the fictitious characters being suitable to the contents of the voiced phonetic-sound information.

Furthermore, in the server according to the present invention, the timing determining means produces timing information which shows the determined timing, and the transmitting means transmits the voiced phonetic-sound information and the timing information corresponds to each piece of the voiced phonetic-sound information. Furthermore in the server according to the present invention, the timing determining means transmits the voiced phonetic-sound information to the transmitting means in the reproduction timing.

Furthermore, the server according to the present invention, further comprises: a searching means for, on the Internet, searching for and collecting information provided as the base of the conversational contents of the voiced phonetic-sound information; and a phonetic-sound information producing means for producing the voiced phonetic-sound information based on the collected provided information and storing the voiced phonetic-sound information in the storage means, wherein: the searching means searches for and collects picture-image information, using a tag given to the picture-image information which shows the contents of the picture-image information; the phonetic-sound information producing means produces the voiced phonetic-sound information, using the tag; and the transmitting means transmits the voiced phonetic-sound information which is applicable to each client machine and the picture-image information.

Furthermore, the server according to the present invention, further comprises: a receiving means for receiving information provided as the base of the conversational contents of the voiced phonetic-sound information via an information-provision managing server which manages the provision of information given by an information providing server, the receiving means being communicably connected to the information-provision managing server; a user phonetic-sound receiving means for receiving, from the client machines, user phonetic-sound information which is collected while the voiced phonetic-sound information is reproduced and for a predetermined period after the voiced phonetic-sound information is reproduced, the user phonetic-sound information showing the phonetic sound of a user who uses the client machines; an analyzing means for analyzing a response of the user based on the received user phonetic-sound information; and an information transmitting means for transmitting user response information which shows the analyzed user response to the information-provision managing server, wherein the receiving means receives the provided information which is selected based on the user response information by the information-provision managing server.

Furthermore, the server according to the present invention, further comprises: a searching means for, on the Internet, searching for and collecting information provided as the base of the conversational contents of the voiced phonetic-sound information; a phonetic-sound information producing means for producing the voiced phonetic-sound information based on the collected provided information and storing the voiced phonetic-sound information in the storage means; a user phonetic-sound receiving means for receiving, from the client machines, user phonetic-sound information which is collected while the voiced phonetic-sound information is reproduced and for a predetermined period after the voiced phonetic-sound information is reproduced, the user phonetic-sound information showing the phonetic sound of a user who uses the client machines; and an analyzing means for analyzing a response of the user based on the received user phonetic-sound information, wherein the searching means lowers the frequency of searches for provided information of the same kind as a phonetic sound in which the analyzed user response is made if the user response is a negative response. Furthermore, instead of this, the searching means heightens the frequency of searches for provided information of the same kind as a phonetic sound in which the analyzed user response is made if the user response is a positive response.

Furthermore, the server according to the present invention, further comprises: a receiving means for receiving information provided as the base of the conversational contents of the voiced phonetic-sound information via an information-provision managing server which manages the provision of information given by an information providing server, the receiving means being communicably connected to the information-provision managing server; a user-response information receiving means for receiving, from the plurality of client machines, user response information which shows the response of a user while the voiced phonetic-sound information is reproduced or for a predetermined period after the voiced phonetic-sound information is reproduced; a judging means for judging whether the user permits the transmission of the received user response information to the information-provision managing server; and a user-response information transmitting means for transmitting only the user response information whose transmission is judged to be permitted by the judging means, to the information-provision managing server, wherein the receiving means receives the provided information which is selected based on the user response information by the information-provision managing server.

Furthermore, an information-provision managing server according to the present invention, which manages, over a server, the provision of information provided as the base for determining the conversational contents of a plurality of pieces of voiced phonetic-sound information whose contents are respective voices of a plurality of speakers in a conversation made up of the voices of the plurality of speakers, the server producing the voiced phonetic-sound information, determining reproduction timing of the voiced phonetic-sound information and transmitting the voiced phonetic-sound information reproduced in the reproduction timing to a plurality of client machines connected communicably thereto, comprises: a requesting means for requesting an information providing server which provides the provided information to transmit the provided information to the server; and a rate charging means for charging the information providing server a rate for giving an opportunity of providing the provided information if the requesting means makes a request.

Furthermore, the information-provision managing server according to the present invention, further comprises: a preference-data producing means for receiving, from the server, user response information which shows the response of a user to the voiced phonetic-sound information reproduced in the client machines, and based on the received user response information, producing preference data which shows a preference of the user who uses the server that transmits the user response information; and a transmitting means for transmitting, over a network, the produced preference data to the information providing server, wherein the rate charging means charges the information providing server a rate for the transmission of the preference data.

Furthermore, a client machine according to the present invention, which is, together with other client machines, communicably connected to a server, and reproduces phonetic-sound information distributed from the server and provides a phonetic sound to a user, comprises: a phonetic-sound information receiving means for receiving, from the server, voiced phonetic-sound information whose contents are respective voices of a plurality of speakers in a conversation made up of the voices of the plurality of speakers; and a phonetic-sound reproducing means for reproducing the voiced phonetic-sound information transmitted in reproduction timing which is determined by the server.

Furthermore, a phonetic-sound reproducing method according to the present invention, in which a server that a plurality of client machines are connected to distributes phonetic-sound information to the client machines and reproduces the distributed phonetic-sound information, comprises: a phonetic-sound information storing step of the server storing a plurality of pieces of voiced phonetic-sound information whose contents are respective voices of a plurality of speakers in a conversation made up of the voices of the plurality of speakers; a timing determining step of the server determining reproduction timing of each piece of the voiced phonetic-sound information; and a phonetic-sound information transmitting step of the server transmitting, the voiced phonetic-sound information which is reproduced in the reproduction timing by the client machines, to the client machines which are applicable thereto.

Furthermore, a phonetic-sound reproducing program stored in a recording medium according to the present invention, which is used for distributing phonetic-sound information to a plurality of client machines and reproducing the distributed phonetic-sound information, allows a server to function as: a phonetic-sound information storing means for storing voiced phonetic-sound information whose contents are respective voices of a plurality of speakers in a conversation made up of the voices of the plurality of speakers; a timing determining means for determining reproduction timing of each piece of the voiced phonetic-sound information; and a phonetic-sound information transmitting means for transmitting the voiced phonetic-sound information, which is reproduced in the reproduction timing by the client machines, to the client machines which are applicable thereto.

These and other objects, features and advantages of the present invention will become more apparent upon reading of the following detailed description along with the accompanied drawings.

DETAILED DESCRIPTION OF INVENTION

Hereinafter, a displaying unit according to each embodiment of the present invention will be described with reference to the accompanied drawings.

Figure 1:
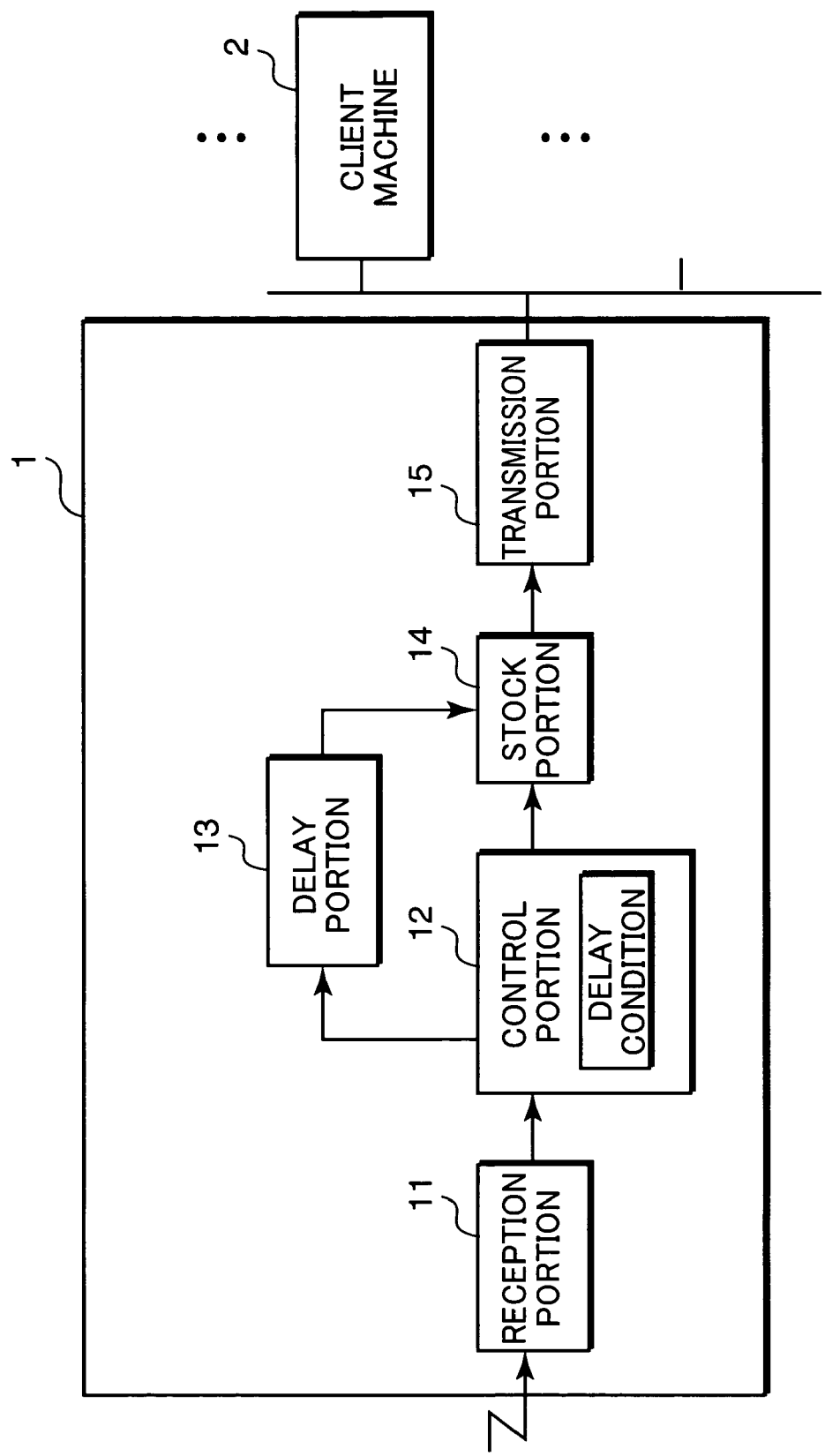
FIG. 1 is a block diagram, showing a conventional information displaying system.
Figure 2:
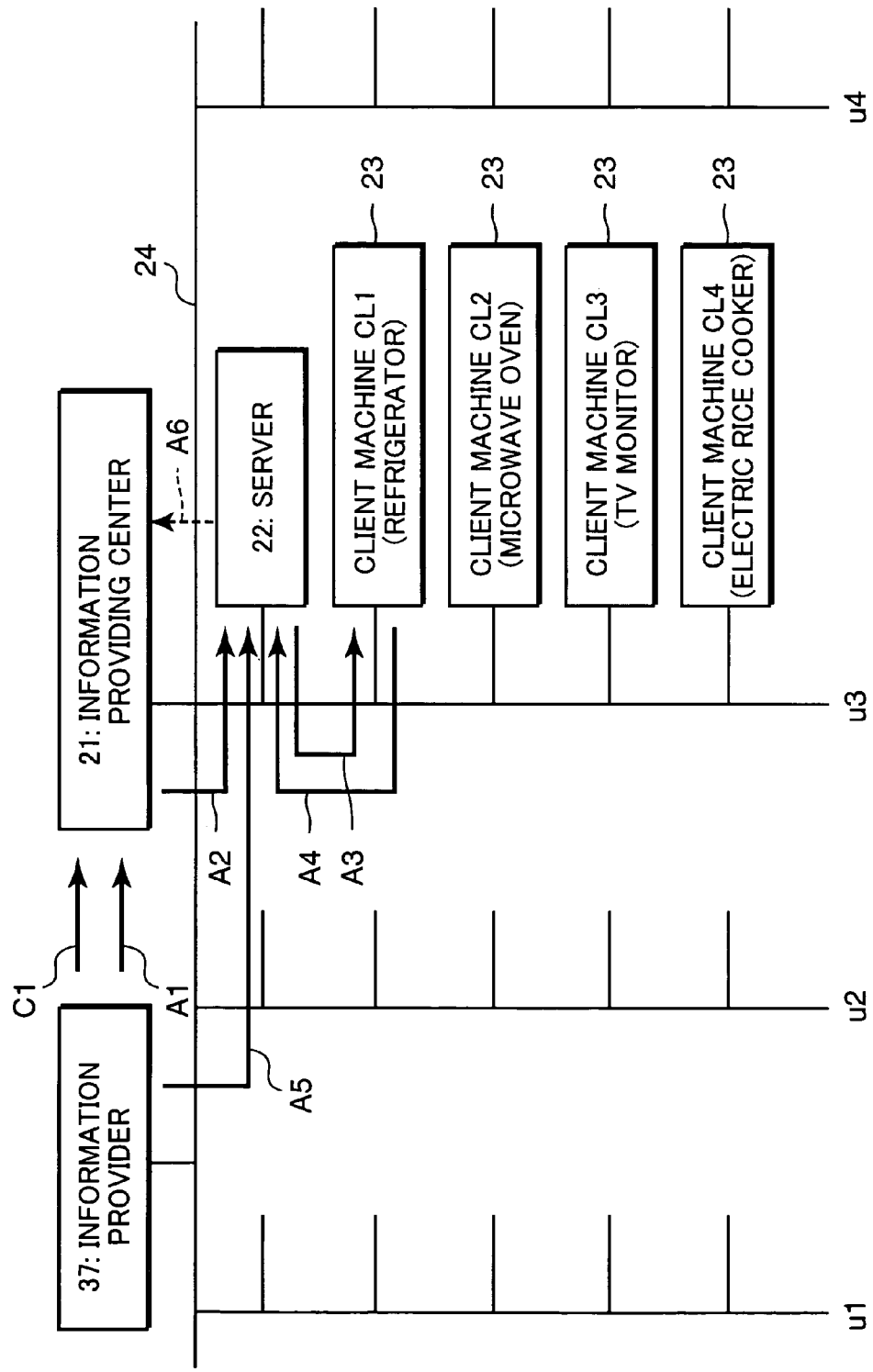
FIG. 2 is a block diagram, showing a phonetic-sound providing system according to a first embodiment of the present invention.

The phonetic-sound providing system according to a first embodiment of the present invention will be described, using FIG. 2 to FIG. 4. FIG. 2 is a block diagram, showing the phonetic-sound providing system according to the first embodiment of the present invention. In this phonetic-sound providing system, provided information, such as provided conversation information and picture-image information, includes information such as an advertisement (or a commercial message) from an information provider. The information provider pays for the provision of the information to users u1 to u3, resulting in operational funds. Herein, the provided information is provided to the user u3, using a provided-information system. Reference characters and numerals A1 to A5, and C1, show the flow of information and funds.

The phonetic-sound providing system according to this embodiment is configured by: a LAN (or local area network) 24 which is connected to a communication network such as the Internet; a server 22 which is connected to the LAN 24 and produces phonetic-sound information such as a conversation file (or voiced phonetic-sound information); and a plurality of client machines 23 which is connected to the LAN 24 and includes a means (e.g., a source of sound or a speaker) of reproducing the conversation file and providing the phonetic-sound information to a user. Herein, the contents of the conversation file are voices which make up a conversation. By coordinating the reproduction timing of a plurality of conversation files, a phonetic sound is outputted as if each client machine 23 is having the conversation.

In the phonetic-sound providing system according to this embodiment, the server 22 is connected, over the communication network such as the Internet, to an information providing center 21 (or an information-provision managing server) and an information provider 37 (or an information providing server). This information providing center 21 and the information provider 37 are connected to each other over the communication network.

The server 22 is configured mainly by a picture-image information server with a built-in hard disk on which picture-image information is stocked, for example, such as a television set. As shown by the arrow A2 and the arrow A5, it receives provided information which is provided from the information providing center 21 or the like. Herein, the provided information includes information on the conversation of a conversation file, such as picture-image information and phonetic-sound information. Specifically, it is information on advertisements for merchandise, news such as weather forecasts, sports, politics and the like, or others. According to this embodiment, the server 22 is a home server which is installed in the same building as each client machine 23, but it is not necessarily limited to such a server.

The client machine 23 is a household electrical appliance or the like, which is provided with a stereo-sound reproducing unit. For example, it is kitchen equipment such as a microwave oven, an electric rice cooker, a vacuum cleaner and a dishwasher, lighting equipment such as an electric lamp, stereo-sound equipment such as a stereo player, an air conditioning equipment such as an air conditioner and an electric fan, communication equipment such as a telephone and an inter-phone, an interior such as an ornament, a clock and a sofa, or an exterior such as a bag and clothes. The client machine 23 may also be information equipment such as a personal computer, two-dimensional and three-dimensional television monitors and a cellular-phone terminal which are provided with a picture-image displaying unit and a stereo-sound reproducing unit, and a watch, pastime equipment such as a home-use robot and a toy, a screen which is attached to a refrigerator, a washing machine, a desk for studying, a commonly-used Japanese table called "kotatsu", a wall, a curtain, furniture, a framed painting, fitness gear or the like, a space such as a bathroom, a bedroom, a living room and an automobile which are provided with the above described equipment, or the like. Each client machine 23 has an IP (or Internet protocol) address which is used for reproducing picture-image information, or stereo-sound information including phonetic information, as shown by the arrow A3, which is sent from the server 22.

The information provider 37 is a manufacturer or retailer. As shown by the arrows A1 and A2, it distributes provided information through the information providing center 21, selectively to the users who need it. This helps it unerringly provide information to users. As shown by the arrow A5, the information provider 37 can distribute provided information directly to the server 22, when it is directly searched using a searching function by the server 22.

The information providing center 21 (or the information-provision managing server) manages the distribution of provided information. As shown by the arrow A2, it distributes information (i.e., the provided information) to the client machines 23, and at the same time, as shown by the arrow C1, it imposes the cost of distributing information on the information provider 37, according to the quantity of information that is dealt in. Herein, the information providing center 21 may also be a provider. As shown by the arrow A2, the information providing center 21 provides users provided information which is selected based on questionnaires on the users preferences, or the information according to which the users are sorted out (e.g., age and gender).

The server 22 has at least one of the following functions. (1) It searches for and collects provided information which corresponds to the users' preferences on the Internet. (2) It receives, from a specific information providing center 37, provided information which is targeted on the users' preferences. (3) It collects information on the ghost of each client machine 23 (or information which shows a fictitious character owned by each client machine 23). (4) It produces a conversation file (or voiced phonetic-sound information) which makes up a conversation between the plurality of client machines 23 according to the ghosts, based on the collected provided information. (5) It collects information on a built-in clock (or information which shows the hour by the built-in clock) of each client machine 23. (6) It determines a reproduction-start time, or the time when each client machine 23 starts the conversation (or reproduces the voiced phonetic-sound information), and produces a reproduction-time timetable which shows the reproduction-start time. (7) It transmits the conversation file (or the voiced phonetic-sound information) to a client machine which being applicable to it, or the client machine 23 where the conversation file should be reproduced. (8) It analyzes a user phonetic-sound information which shows the phonetic sound of a user which is collected in the client machine 23. (9) It associates the result of the analyzed user phonetic-sound information with information provided to the user, and sends preference information which shows the preferences of the user to the information providing center 21. Herein, the preference information shows information preferred by the user. For example, if a user takes a positive response frequently when information on sports is provided, that means the user prefers the information on sports. Herein, the preference information includes user response information which shows how the user has responded to provided information.

The client machine 23 has at least one of the following functions. (1) It reproduces a conversation file which is sent from the server 22. (2) It reproduces a picture-image file which is sent from the server 22. (3) It collects the phonetic sound of a user as user phonetic-sound information. (4) It sends the user phonetic-sound information to the server 22.

The information providing center 21 has at least one of the following functions. (1) It selects provided information which is provided to a user according to the preferences of the user, and sends the provided information to the server. (2) It receives the preference information of a user from the server 22. (3) It charges the information provider 37 an information-provision rate for giving an opportunity of providing provided information, according to the quantity of the provided information which is provided to a user by an information provider.

Figure 3:
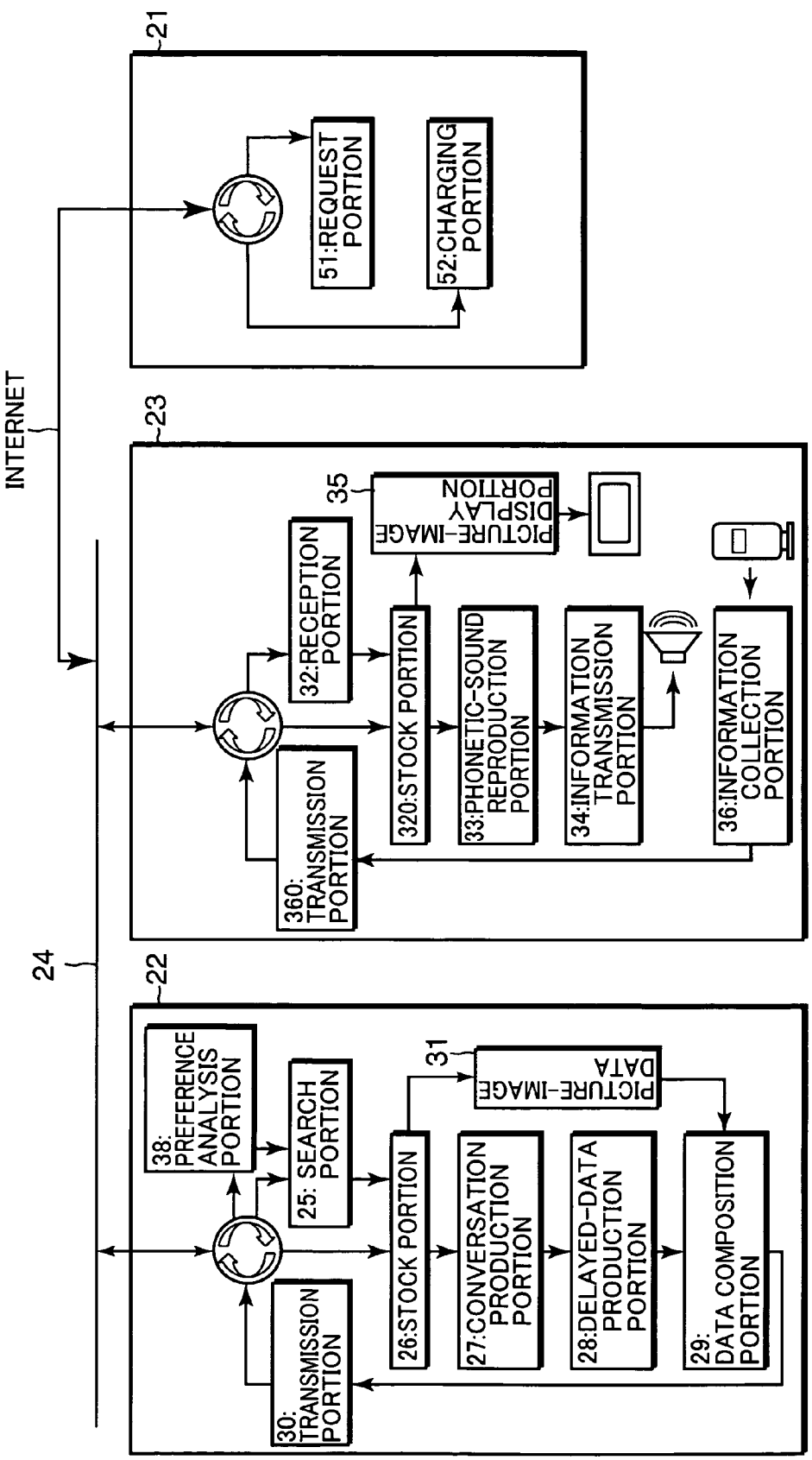
FIG. 3 is a block diagram, showing main functions of the phonetic-sound providing system shown in FIG. 2 and an information providing center.

FIG. 3 is a block diagram, showing main functions of the phonetic-sound providing system shown in FIG. 2 and an information providing center 21. The phonetic-sound providing system according to this embodiment collects information from a site which is set by a user, or collects information on the Internet using a searching engine. In the phonetic-sound providing system according to this embodiment, the server 22 and the plurality of client machines 23 are connected to the LAN 24. Herein, on behalf of the plurality of client machines 23, one client machine 23 will be described.

The server 22 is made up of a search portion 25, a stock portion 26, a conversation production portion 27, a delayed-data production portion 28, a data composition portion 29, a transmission portion 30, and a preference analysis portion 38. The search portion 25 functions as a searching means and a receiving means. It searches for and collects provided information, such as picture-image information or phonetic-sound information and text information which a user wants, using a searching engine or the like. The stock portion 26 functions as a storing means. It stocks picture-image information or phonetic-sound information, text information, or the like which are searched. The conversation production portion 27 functions as a phonetic-sound information producing means. It produces, on a text base, a tag which is attached to a picture-image file or a conversation file of the stocked picture-image information or phonetic-sound information, or a conversation between a plurality of speakers from the text information. Herein, the tag which is attached to the picture-image file or the conversation file is a keyword which shows the contents of the picture-image file's picture-image or the conversation file's conversation. It is used for searching for the picture-image file or the conversation file over the network.

Then, the conversation production portion 27 produces a conversation file which is a phonetic-sound file from the conversation which is produced on a text base according to the ghost of each client machine 23, and stores it in the stock portion 26. Herein, the "ghost" is data on a character including a fictitious character. For example, "SHIORI" or the like is a typical code name of the ghost. A program which is the core of a client machine loaded with the ghost is called a "main body". It conducts processing of a script used for describing the source data of a sentence which is displayed in a "balloon" and also conducts something else.

The delayed-data production portion 28 functions as a timing determining means. It produces a reproduction-time timetable where a reproduction-start time (or reproduction timing) is set according to the reproduction time of a conversation file of each ghost 23. For example, after one conversation file has been reproduced, the next conversation file has to be reproduced, so that the time when the conversation file of each ghost is reproduced will not overlap each other. In consideration of this, the reproduction-start time is set.

The data composition portion 29 gives the reproduction-start time - which is described on the reproduction-time timetable to the picture-image file or the conversation file. The transmission portion 30 functions as a transmitting means. It transmits the picture-image file and the conversation file to an IP (or Internet protocol) address of the client machine 23 which corresponds to them. The preference analysis portion 38 functions as a user phonetic-sound receiving means, an analyzing means and an information transmitting means. It analyzes the preference of a user using the phonetic sound of the user which is collected by each client machine 23 and then adjusts a formula for searching. The preference analysis portion 38 also has the function of collecting the phonetic sound of a user, and thus, the searching formula can be adjusted using the collected phonetic sound.

The client machine 23 is made up of a reception portion 32, a stock portion 320, a phonetic-sound reproduction portion 33, an information transmission portion 34, a picture-image display portion 35, an information collection portion 36 and a transmission portion 360. The reception portion 32 functions as a phonetic-sound information receiving means. It receives a conversation file and a picture-image file which are sent from the server 22. The stock portion 320 is formed with a stocking device such as a hard disk or a semiconductor memory. It stocks the conversation file and the picture-image file which are received in the reception portion 32, and sends the conversation file and the picture-image file to the phonetic-sound reproduction portion 33 and the picture-image display portion 35, respectively, at a given time shown on a reproduction-time timetable which is given to the conversation file and the picture-image file.

The phonetic-sound reproduction portion 33 functions as a phonetic-sound reproducing means and reproduces the transmitted conversation file. The information transmission portion 34 is formed with a speaker and the like. It outputs the phonetic sound of the reproduced conversation file and provides it to a user. The picture-image display portion 35 functions as a picture-image displaying means. It is formed with a display control portion, an LCD (or a liquid crystal display) and the like, and reproduces the received picture-image file and displays a picture-image. The information collection portion 36 has a recording function and collects a phonetic sound which is produced by a user, or the like. The transmission portion 360 converts; the user phonetic-sound information, which shows the collected phonetic sound of a user, into a file, and transmits it to the server 22.

The information providing server 21 includes a request portion 51 and a charging portion 52. The request portion 51 functions as a requesting means. It requests the information provider 37 to transmit provided information to the server 22. The charging portion 52 functions as a rate charging means. It charges the information provider 37 a rate for giving an opportunity of providing the provided information if the request portion 51 makes a request.

Hereinafter, an operation of this phonetic-sound providing system will be described using FIG. 4 and FIG. 5. FIG. 4 is a flow chart, showing an example of information-control processing which is executed by the phonetic-sound providing system shown in FIG. 2. In a step 1, the search portion 25 searches constantly for provided information which a user wants over a communication network such as the Internet, using a searching engine. For example, the search portion 25 stores a keyword which shows provided information desired by a user and searches for the provided information which corresponds to this keyword. A search is made using this or another method.

Picture-image information, which is a part of provided information, is a set of a plurality of picture-image files. To each picture-image file, a tag which shows the contents of the picture-image file's event is given as text information. Therefore, a search can be made using this tag, such as searching for the picture-image file which is provided with the tag that corresponds to a keyword. In addition, a search may be made using a site which is set by a user. For example, if a site which is provided with a news flash is set up, a search may be made using the news-flash site.

Next, if the information provider 37 is providing the provided information which corresponds to a search in the search portion 25, as shown by the arrow A5 in FIG. 2, the information provider 37 transmits, to the search portion 25, the provided information which corresponds to the search (S2). Then, the search portion 25 receives this provided information (S3). Herein, the search portion 25 may obtain the provided information, not from the information provider 37, but from another information provider. Next, information-provision processing (or phonetic-sound provision processing) is executed in a step S4.

Figure 4:
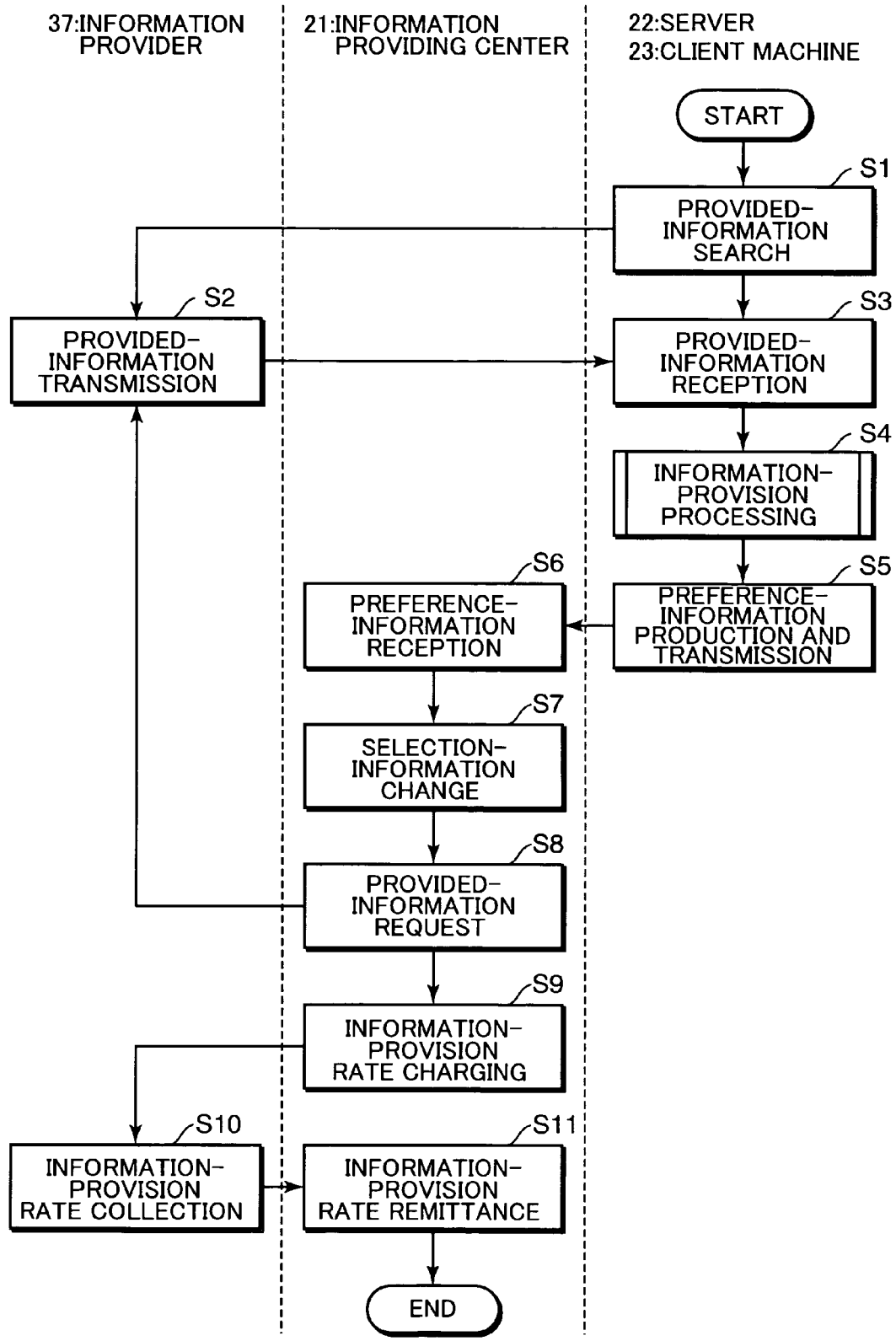
FIG. 4 is a flow chart, showing an example of information-control processing which is executed by the phonetic-sound providing system shown in FIG. 2.
Figure 5:
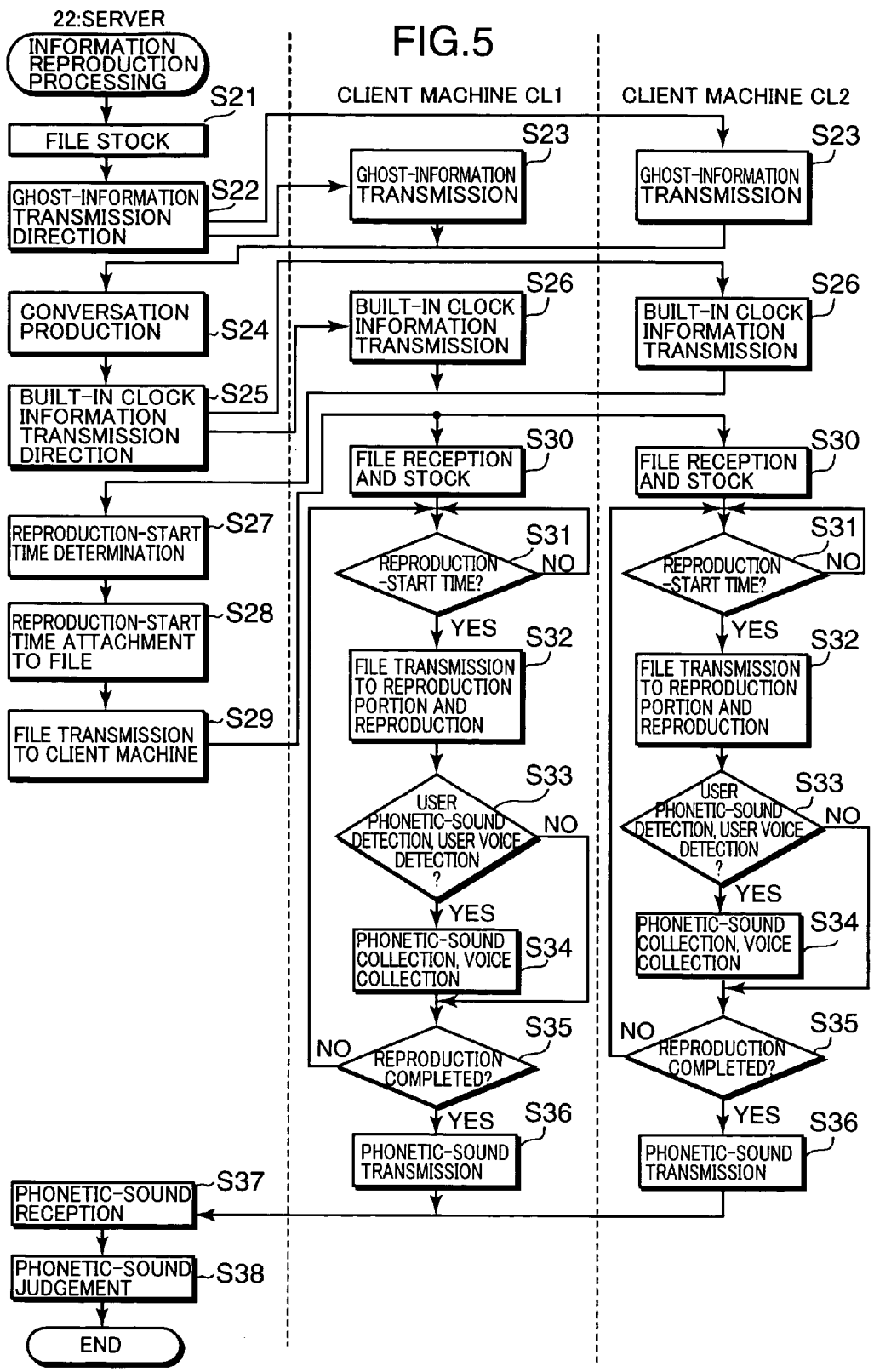
FIG. 5 is a flow chart, showing an example of information-provision processing shown in FIG. 4.

FIG. 5 is a flow chart, showing an example of information-provision processing shown in FIG. 4. Herein, a system is shown in which as a first means of taking reproduction timing of the conversation file produced in the server 22, each client machine 23 starts a following conversation reproduction according to a reproduction-start time which is calculated beforehand based on the phonetic-sound reproduction speed of the client machine 23.

First, information such as picture-image information, music information and phonetic-sound information, and text information such as news, which are received by the search portion 25, are stocked as provided information in the stock portion 26 (S21). The conversation production portion 27 directs each client machine 23 to transmit ghost information which shows the characteristic of a ghost of each client machine 23 (S22). The transmission portion 360 of each client machine 23 which has received this direction transmits the ghost information to the server 22 (S23).

Via the search portion 25 which has a function of a transmitting means, the conversation production portion 27 receives this ghost information and produces a text-base conversation according to the ghost of each client machine 23. For example, ghost information shows a parameter which represents the conversation speed of a ghost and the character (such as cheerful, optimistic, gloomy and pessimistic) of the ghost of each client machine 23. If the parameter that represents a cheerful character is higher than any other client machine, a merry conversation in a cheerful tone is produced on a text base.

The conversation production portion 27 composes a conversation based on the contents of a tag which shows the contents of an event of a plurality of picture-image files which makes up picture-image information. Herein, the tag is given as text information to those picture-image files. This tag may be a tag which is used for a search by the search portion 25. The picture-image file is divided in a position where an event (e.g., a serious phenomenon which has occurred to the contents of the picture-image file) starts. And a tag is given to each divided picture-image file in the position where it is divided (e.g., at the head of the divided picture-image file). In this way, the order in which each picture-image file is reproduced is determined so that they can form a series of pieces of picture-image information. For example, if you take picture-image information on the scene where an airplane has crashed into a building, a picture-image file is divided in two, before and after the picture-image which shows the moment the airplane has crashed into the building. In the divided picture-image file, a tag such as "airplane, building and before the crash" is given to its front part, and a tag such as "airplane, building, the moment it crashed and building in flames" is given to its rear part. Then, using these tags, a conversation file is produced. If the produced conversation file is reproduced synchronously with the picture-image file, then a phonetic sound which corresponds to the contents of the picture-image is outputted.

As described above, a picture-image file is divided at its point (or a position in which an event occurred) and tags are given to them. However, a timetable may also be given to a picture-image file, in which the contents of an event and its reproduction-start time are described. In this case, a conversation file is produced, using information which shows the contents of an event. In other words, it is produced at the reproduction-start time of the picture-image file which corresponds to the contents of an event of the conversation file. This method is effective in the case where a large number of events are dispersed in a picture-image file. It improves the continuity of images at a reproduction time because there is no need for the division of a picture-image file. In addition, in the case of music information, tags such as a performer, a writer and a composer, the contents of music, a category and a tempo are given to it. Therefore, the conversation production portion 27 may also produce a conversation using these tags.

As described above, tags are used and a conversation is produced on the text base. For example, if the above described picture-image file tags are used, a conversation file before the moment an airplane crashes into a building shows the following conversation. The conversation of a client machine c11 is like, "Yoko, it seems we've got a dreadful picture." The conversation of a client machine c12 (Yoko in a ghost) is like, "What's happened?" The following conversation of the client machine c11 is like, "An airplane is about to crash into a building. Watch it."

After the moment an airplane has crashed into a building, the conversation of the client machine c12 is like, "Oh!." The conversation of the client machine c11 is like, "The airplane's hit it!." The following conversation of the client machine c12 is like, "Look, the building's bursting into flames."

As described above, information on a ghost of each piece of equipment (or each client machine 23) is taken into the server 22. But the conversation production portion 27 shares tags in a plurality of speaking voices based on the ghost information and produces a conversation made up of the plurality of speaking voices by multitasking for each ghost. In addition, the conversation production portion 27 produces a conversation made up of the voices of a plurality of speakers on the text base, not only using a picture, but also using tags or text information attached to a phonetic file.

Then, the conversation production portion 27 produces a conversation file for each ghost based on the conversation produced on the text base (S24). In other words, a conversation made up of the voices of a plurality of speakers is allotted to each client machine 23 being suitable to the character of each ghost shown by the ghost information. A conversation file which has the contents of the allotted conversation is produced in the way to suitably speak with respect to the character of each ghost shown by the ghost information.

Thereafter, in a step 25, the delayed-data production portion 28 directs each client machine 23 to transmit a built-in clock information which shows the hour by a built-in clock. In a step 26, the built-in clock information is transmitted from each client machine 23 which responds to the direction. Then, the delayed-data production portion 28 receives the built-in clock information via the search portion 25.

In a series of conversations which becomes the contents of a conversation file, the delayed-data production portion 28 allows this series of conversations to be realized. TO do this, the delayed-data production portion 28 determines the time when each client machine 23 starts to reproduce a conversation file and a picture-image file according to the reproduction time of the conversation file by each client machine 23, and then, it produces a reproduction-time timetable where the reproduction-start time is set (S27). The ghosts of the client machines 23 differ with each other in the speed of speaking, but the delayed-data production portion 28 takes into account the difference between the speaking speeds of the ghosts of the client machines 23, which is shown by the ghost information, and thus, it produces the reproduction-time timetable, so that the conversations of the client machines 23 cannot overlap each other and the conversation cannot be broken off.

In the reproduction-time timetable, the reproduction-start time is determined which is the base of the hour by the built-in clock of each client machine 23 shown in the built-in clock information. In other words, the reproduction time of a conversation file and a picture-image file is determined in line with the built-in clock of the client machine 23 which reproduces the conversation file. Under normal conditions, the built-in clock of each client machine 23 is automatically set at standard time on the Internet. However, the hour by the built-in clock of each client machine 23 may not correspond to the hour by a built-in clock of the server 22. Finally, the data composition portion 29 gives the reproduction-start time described on the reproduction-time timetable to a picture-image file or a conversation file (S28). Herein, at the part of the header of a picture-image file or a conversation file, the following may be described: an IP (or Internet protocol) address of the client machine 23 (or a client machine 23 which a file is transmitted to); the name of a client machine; an IP (or Internet protocol) address of the server 22; the management number given to a conversation file; phonetic-sound information on a ghost such as the volume of sound and the quality of phonetic sound; the reproduction-start time of a file (or timing information which shows a reproduction-start time); the reproduction time of a file; and the like.

This picture-image file or conversation file to which the reproduction-start time is given is transmitted by the transmission portion 30 (S29) to the IP (or Internet protocol) address of the client machine 23 which corresponds to it. Specifically, this information (i.e., a picture-image file or a conversation file) is transmitted, over the LAN 24, to the client machine 23 which has the set IP (or Internet protocol) address. Herein, an IP (or Internet protocol) address is used, but an address is not limited to this. If the LAN 24 is not connected directly to the outside, a specific address may also be used.

To each client machine 23, a series of conversation files and picture-image files which corresponds to each client machine 23 is sent all at once from the server 22. The client machines 23 receive the conversation files and picture-image files in the reception portion 32 and stock them in the stock portion 320 (S30). The stock portion 320 judges whether the time has become a predetermined reproduction-start time which is given to the stocked conversation files and picture-image files (S31). Unless it judges that it has become the predetermined reproduction-start time (S31; NO), the step S31 is repeatedly executed.

If it judges that it has become the predetermined reproduction-start time (S31; YES), the stock portion 320 transmits the picture-image files to the picture-image display portion 35 and transmits the conversation files to the phonetic-sound reproduction portion 33. Then, in the phonetic-sound reproduction portion 33, the phonetic-sound files or stereo-sound files which include the transmitted conversation files are reproduced. In the picture-image display portion 35, the picture-image files are reproduced (S32). The phonetic-sound or sound information is provided to a user through the information transmission portion 34 such as a speaker. The picture-image files are provided to a user through the picture-image display portion 35.

There is no need for a user to pay attention constantly to the information (such as information on a conversation and a picture-image) provided from each client machine 23. This is because the phonetic-sound providing system according to the present invention is characterized by not making it a condition that a user is listening to information. On the other hand, conventional phonetic-sound providing systems have the object of precisely transmitting information to a user. Thus, in such conventional systems, a user always has to carefully listen to the information from the client machine 23. Especially, a user used to be disappointed with worthless information. In addition, a user has to respond to the information provided from the client machine 23, thereby making the user feel uncomfortable.

In contrast, in the phonetic-sound providing system according to the present invention, there is no need for a user to actively make any responses such as replies to the information provided from the client machine 23. And the client machine 23 makes no requests to a user. In other words, this system turns its attention to the fact that the client machines 23 simply hold a conversation about the contents which a user is interested in, and thus, that the user turns his attention to the contents on his own accord if he has a great interest.

Especially, a user can guess how important a certain piece of information is, using an expression of exclamation in a conversation between the client machines 23. If the information provided from the client machines 23 is extremely important, a tag which says it's important is given to a picture file, or a text file includes the contents of it's important, it's urgent or the like, when a conversation is produced on the text base. Therefore, when the server 22 produces conversation data, it produces a conversation file more frequently, uses an exclamation mark, or changes the tone of a phonetic sound, so that it can produce a conversation file which attracts a user's attention. In other words, this phonetic-sound providing system is characterized by not confirming whether a user has received information.

This phonetic-sound providing system does not request any responses to the information provided to a user, but it monitors the user's response to the provided information. The information collection portion 36 detects the phonetic sound of a user and judges whether it has been detected (S33). If it judges that the phonetic sound of a user has been detected (S33; YES), the information collection portion 36 collects the detected phonetic sound and the like, while a conversation file or a picture file is being reproduced and for a predetermined period after it has been reproduced (S34). If it does not judge that the phonetic sound of a user has been detected (S33; NO), then a step S35 is executed. In the step S35, a judgment is made whether all the conversation files and the picture files have been reproduced. If the judgment is not made that all the conversation files and the picture files have been reproduced (S35; NO), a return is made to the step S31. Then, a judgment is made whether a reproduction-start time has come of the phonetic-sound files or conversation files which are not reproduced.

If the judgment is made that all the conversation files and the picture files have been reproduced (S35; YES), the transmission portion 360 turns a distinctive phonetic sound of the collected phonetic sounds into a phonetic-sound file, and as shown by the arrow A4 in FIG. 2, transmits it as user phonetic-sound information to the server 22 (S36). For example, the distinctive phonetic sound is determined according to how loud the voice of a user is, or the like. Herein, if phonetic sounds are not collected at all, then a step S36 is not executed and this information-provision processing is completed.

To this phonetic-sound file which is user phonetic-sound information, the following information is given: an IP (or Internet protocol) address of the server 22; the name of a client machine (or a client-machine 23 name which transmits the user phonetic-sound information); an IP (or Internet protocol) address of the client machine 23 (or the client-machine 23 which transmits the user phonetic-sound information); the management number given to a conversation file; and a phonetic-sound file which shows the phonetic sound of a user. In other words, the above information shows which conversation file is reproduced and how a user responds to that file.

The preference analysis portion 38 receives conversation files which are user phonetic-sound information (S37). Then, it judges how much a user is interested in the information provided to the user, using these conversation files which are user phonetic-sound information from each client machine 23 (S38). The preference analysis portion 38 changes the conditions for searching in the search portion 25, based on how much the user is interested. Specifically, if the preference analysis portion 38 judges the user's response negative, feedback to the search portion 25 is executed so that searching will be less frequently executed for the same kind of provided information as the information which is being reproduced when the response has been made. For example, if the search portion 25 is executing a keyword search, the preference analysis portion 38 rearranges or changes the keyword at the time of a search, so that searching will not be executed for the same kind of provided information as the information which is being reproduced when the negative response has been made. On the other hand, if the preference analysis portion 38 judges the user's response positive, feedback to the search portion 25 is executed so that searching is more frequently executed for the same kind of provided information as the information which is being reproduced when the response has been made. For example, if the search portion 25 is executing a keyword search, the preference analysis portion 38 changes the keyword, so that searching will be executed for the same kind of provided information as the information which is being reproduced when the positive response has been made. Then, the information-provision processing is completed.

A negative phrase, for example, has three syllables or fewer, such as "i-ran!" or "I don't want.", "ya-me-te!" or Stop it!, and "ru-se!" or "Shut up!" Accordingly, if it detects a response which has three syllables or fewer, the preference analysis portion 38 judges the user has little interest, and executes feedback to the search portion 25 so that searching will be less frequently executed for the same kind of provided information as the information which is being reproduced when the response has been made. If a user's response phrase has four syllables or more, such as "so-re-ka-ra", "do-shi-ta-no" or "Then", "What's happened?", the preference analysis portion 38 judges the response positive, and executes feedback to the search portion 25 so that searching will be more frequently executed for the same kind of provided information as the information which is being reproduced when the response has been made.

Furthermore, the frequency of a user phonetic-sound becomes low if the response is negative. If it is less than 100 Hz, the preference analysis portion 38 usually judges the detected response negative, and if it is equal to, or more than, 100 Hz, it judges that the response is positive. If the method in which a judgment is made using the number of syllables is combined with the method in which a judgment is made using the frequency of a phonetic sound, then a judgement will be more precisely made whether a user response is positive or negative.

Furthermore, this allows a user to become familiar with a criterion for the judgement, enabling the user to let the client machine 23 know, intentionally and actively, how much he is interested. Herein, the user can get his negative feelings across to the client machine 23, by saying "Oh!" or "Ah!" in a low voice. This presents an advantage in that there is no need for the user to care whether the client machine 23 has really understood his response. In addition, the server 22 does not need to pry into the contents of a conversation in dealing with a user response. This makes algorithm for processing simpler and realizes high-speed processing.

In a step S5 of the above described FIG. 4, the preference analysis portion 38 produces preference information which shows a user's preference, based on the user's interest in the information provided to the user which is judged at the step S38. Then, it transmits it, as shown by an arrow A6, to the information providing center 21 (S5).

For example, the preference analysis portion 38 detects a conversation file which is reproduced at the time when the user's response has been detected, with reference to a reproduction-time timetable. Then, it judges the contents of this conversation file by judging the terms used in a conversation of the text base which corresponds to the conversation file. Next, the preference analysis portion 38 relates the contents of the conversation file to the user's response, and thus, it produces preference information which shows the contents of a conversation file which includes more negative responses than positive ones and the contents of a conversation file which includes more positive responses.

In the information providing center 21, the request portion 51 receives preference information (S6). Then, it changes selection information which is held in the request portion 51, based on the received preference information (S7). This selection information is information which is held in the information providing center 21, and it shows the kind of provided information desired by each user. This selection information is produced based on questionnaires on the users' preferences, or the information according to which the users are sorted out (e.g., age and gender). Next, based on the changed selection information, the request portion 51 requests the information provider 37 to provide the provided information to the user (S8).

This provided-information request is a request to provide the user the kind of provided information which is shown in the selection information. Then, a return is made to the step S2 in the information provider 37. Next, the information provider 37 receives the provided-information request and transmits the provided information to the server 22. Herein, the provided information transmitted by the information provider 37, as shown by the arrow A1 in FIG. 2, is once transmitted to the information providing center 21. Then, as shown by the arrow A2, the information providing center 21 sends the provided information to the server 22. As shown by the arrow A5, the information provider 37 may not transmit the provided information to the information providing center 21 before it transmits it to the server 22. Herein, the provided information to be transmitted is the kind of provided information which shows the changed selection information, which is managed in the information providing center 21.

After the execution of the step S8, in a step S9 of the information providing center 21, the charging portion 52 charges an information-provision rate and directs the information provider 37 to pay for the information-provision rate. This information-provision rate is a charge for the information-provision request by the information providing center 21 and the opportunity of transmitting the provided information which has been given to the information provider 37. The information provider 37 receives the request to pay for the information-provision rate, and then, it makes a remittance for the information-provision rate after the transmission of the provided information has been executed according to the information-provision request (S10). The information providing center 21 confirms that the remitted payment for the information-provision rate has been collected (S11). Then, the information-control processing is completed.

Herein, this phonetic-sound providing system is aimed mainly at providing information to a user, not at an "independent dialogue" between household electrical appliances. In other words, it is a system which "provides information", on schedule and conversationally, to each household electrical appliance (or each client machine). Furthermore, in this phonetic-sound providing system, the server 22 itself executes the production of a conversation file and the determination of a reproduction-start time of the conversation file. In other words, the client machines 23 only reproduce the conversation files which are distributed from the server 22. This presents an advantage in that the processing for coordinating the timing in which each client machine 23 reproduces a conversation file becomes simpler and easier than in the case where the production of a conversation file and the determination of a reproduction-start time of the conversation file are executed by each client machine 23.

In other words, when you think what creates a personality or a character of a computer, you would probably think that software could, rather than hardware. This seems correct, even though there may be different views, as shown by a character of hardware named "HAL" in a movie titled "2001: a Space Odyssey". In this movie, "HAL" wavers and creates the personality of each piece of equipment, as long as the hardware has the same type of specifications as software. In contrast, in the phonetic-sound providing system according to the present invention, a difference is made by a method such as intentionally allotting a different ghost to each equipment (or each client machine 23). In this case, the algorithm or designated parameters of software are thought to create the personality of each equipment (or each client machine 23).

That is thought to make no difference, in relatively slow processing for a conversation or the like, whether a multitask operation is made using a single MPU (micro processor unit), or parallel processing is conducted using a plurality of MPUs (micro processor units) which are connected to a network. This multitask operation includes operating different pieces of algorithm software by multitasking, using one MPU (micro processor unit). Thus, a wav file may also be produced in the server 22, and then, each client machine 23 may reproduce the sent wav file at a designated time (or a reproduction-start time), so that a load becomes light on each client machine 23.

There is a case where extremely complicated processing is required. That is the case when each client machine 23 is not connected to a network, and the individual client machines 23 themselves judge the contents of a conversation using only a phonetic sound produced by each client machine 23. However, according to this embodiment, the server 22 may produce a reproduction-time timetable and a conversation file. And the client machine 23 may produce the received conversation file at a reproduction-start time shown on the reproduction-time timetable. Therefore, there is no need to conduct relatively complicated processing in coordinating the reproduction timing of a conversation file between the client machines 23.

The phonetic-sound providing system according to the present invention is characterized in that the information providing center 21 charges the information provider 37, based on the quantity of information which it provides to a user. Accordingly, this phonetic-sound providing system has the advantage of gaining funds for operating the phonetic-sound providing system from the information provider 37.

According to this embodiment, a single server 22 produces a conversation file, and then, distributes the conversation file to each client machine 23. However, a plurality of servers 22 may be provided to produce a conversation file, though costs become higher. Furthermore, each client machine 23 may also produce a conversation file, based on a conversation (produced on the text base). In that case, however, the processing for coordinating the reproduction timing of a conversation file in the client machine 23 becomes more complicated than in the case where the server 22 produces a conversation file. In that case, the server 22 produces a reproduction-time timetable for delay data required for a conversation between the client machines 23 and distributes it to each client machine 23, so that the conversation can be smoothly held. Accordingly, the server 22 and the client machines 23 are characterized by sharing the conversation used for producing a conversation file.

Furthermore, it is also possible that the server 22 trains each client machine 23 to have an AI (or artificial intelligence), the preference analysis portion 38 of the server 22 analyzes the phonetic sound of a user which is collected by the information collection portion 36 to catch the user's intention, and instructions are given to each client machine 23 that each client machine 23 should exert its own functions. In this case, the following is an example of the contents of a conversation of each client machine 23 with a user. Its background will also be described.

I (or the user u1) have scolded Reiko (or the client machine c11: a refrigerator), who is a saucy girl, "I know the supermarket is having a sale. But I won't go, because I'm tired". Reiko also inputs a purchase list of cooking materials and transmits it to a store which mainly sells cooked vegetable and fish dishes. I buy the materials at that store.

It is noisy around here, because each client machine 23 chat with another after it has been trained to have an AI (or artificial intelligence). Yoko (or the client machine c12: a microwave oven), who is a soft-hearted girl, makes up the couple's squabble. I (or the user u1) mutters to myself, "When talking with each client machine 23, I feel more comfortable than when talking with family members.

Senta (or the client machine c15: a washing machine), who is a boy, often quarrels with Reiko. Sharaku (or the server 22) says, "One and only server 22 is controlling all conversations between the client machines 23. But some client machines 23 don't seem to be on good terms with others.

Sharaku (or the server 22) has whispered, "Kenta (or the user u2: a son of the user u1) has requested what he wants for supper." Kenta is on the second floor, but says, using a mobile-phone terminal, "That's fine". He seems to manage security by that mobile-phone terminal. I use a mobile-phone terminal myself for bank transactions.

When I'm taking a nap or thinking about my personal recipes without taking notice of these kids (or each client machine 23: a household electrical appliance), they start to go into a huddle with each other, saying, "What to do next?" I've put them in a phonetic-sound mode, so I hear each client machine getting into trouble. In the phonetic-sound mode, what they're thinking about is outputted as phonetic sounds. I think that "I'd better give them a hand sometimes". But I think at the same time, "I don't want to be directed by machines or something."

While I'm away, mobile phones (or a client machine c16, a client machine c17) of Masuo (or the user u3: the user u1's husband) and Kenta (or the user u2) look like talking with each other to decide about a menu and then cooking it. They (or each client machine 23) could complete the cooking of about up to four dishes at the same time. There is no need to see if they are properly heated. That will be done automatically according to the recipes. Besides, Yoko controls how long those dishes should cooked. I think, "I'm wondering why Masuo and Yoko would cook together when I'm at home. They should do while I'm away from home. I always get irritated at seeing Masuo and Yoko cooking together merrily.

I do exercise while cooking. Ms. Kusanagi (or a client machine c13: a TV monitor), who is displayed as a ghost's figure in a real-figure copying mode, encourages me by saying, "Dishes on today's menu amount to 300 kcal. Do your best to consume the calorie. Let's do exercise together". Ms. Kusanagi is sweating a great deal. She is too sexy for me to believe she has Sharaku's human wear on. I think, "I want to take a short break just after a breaded pork cutlet is deep-fried. I call out, "Yoko, you haven't decided about the next recipe yet, have you?" That is all for the example.

To each client machine 23, a commonly-known name code is given, such as not only the name of equipment but also the name of persons. This makes a conversation smoother, as if people were holding the conversation. If such a phonetic-sound providing system is introduced to a home where only an elderly person lives or another such, that can create a warmhearted atmosphere as if the person lived with other family members. It also makes it possible to confirm how such an elderly person is getting on, by monitoring how frequently the person who is a user responds. Herein, the "AI training" means the server 22 automatically upgrades the main body or ghost of each client machine 23 over a network, and that the parameters of a ghost is made optimal so that a response to each user becomes more positive.

Furthermore, it is possible for the server 22 to understand the contents of a conversation held by a user. In other words, the preference analysis portion 38 analyzes user phonetic-sound information to understand the contents of the conversation. If it understands the contents of the conversation, a stop is put to the reproduction of a conversation file which is now reproduced in each client machine 23. In the step S24, a conversation file is newly produced according to the contents of the conversation of the user, and then, it is distributed to each client machine 23. Then, each client machine 23 reproduces the distributed conversation file. In this case, the following is an example of the contents of a conversation of each client machine 23 with a user.

The client machine c13 (or the TV monitor) says, "A weather forecast says it will be cold tonight. We should have oden (or stewed vegetables, fish and others) for supper, shouldn't we?"

The client machine c11 (or the refrigerator) replies, "There are-chikuwa (or a tube-shaped fish paste cake) and radish in the vegetable chamber."

The client machine c13 (or the TV monitor) says, "It gets cold if you (or the refrigerator) open the door so frequently."

The client machine c11 (or the refrigerator) replies, "I'm sorry. A small piece of Kon-nyaku (or paste made from konjak flour) also remains in the refrigerator."

The user u1 says, "I'm wondering whether I could have some hot sake at supper."

The client machine c12 (or the microwave oven) says, "You shouldn't. You'll get a medical checkup at the company tomorrow."

The user u1 says, "Oh, that's right! It is a great shock."

This is an example where if the contents of a conversation of a user can be analyzed in the preference analysis portion 38 of the server, then a fresh conversation is produced in the conversation production portion 27, based on the user's remark. In this case, based on the present invention's object of obtaining information necessary for a user from a conversation between the client machines 23, especially, there is no need to determining a reproduction-start time of each conversation file in consideration of the timing of the user's conversation. However, it may also be obtained by taking the timing of the user's conversation into account.

The phonetic-sound providing system according to a second embodiment of the present invention will be described, using FIG. 6 to FIG. 8. The phonetic-sound providing system according to this embodiment is different in user phonetic-sound information and the flow of a rate for information from that according to the first embodiment. The phonetic-sound providing system according to this embodiment not only conducts a macro-analysis for preferences of a user by processing the user's preference information, but also conducts a technical preference analysis. Specifically, with respect to preferences of individual users for individual items of merchandise, the technical preference analysis is conducted about how those individual items are related to each other, how those individual users change their preferences or something like that. Then, preference statistical data (or preference data) is obtained from the analysis and is sent out to the information providing center 21.

The information providing center 21 charges each information provider 37 for the preference analysis information which is sent from this information providing center 21 to each information provider 37. In other words, this phonetic-sound providing system is characterized in that the information provider 37 provides funds to the information providing center 21, not only as a rate for the quantity of information provided to a user by the information providing center 21, but also based on the value of the preference statistical data provided to each information provider 37 by the information providing center 21.

Hereinafter, a configuration of the system according to the second embodiment of the present invention will be described. FIG. 6 is a block diagram, showing the phonetic-sound providing system according to the second embodiment of the present invention. Herein, on behalf of the users and a plurality of information providers 37 (or information providers j1 to j3), the user u3 and the information provider J1 will be described, respectively. Reference characters and numerals A1 to A8, and C1, C2 show the flow of information and funds.

In the phonetic-sound providing system according to this embodiment, information about the information provider 37 is collected in the information providing center 21, based on information on a user's preferences. The phonetic-sound providing system according to this embodiment, in the same way as that according to the first embodiment, is configured by: a LAN (or local area network) 24; a server 22; and a plurality of client machines 23, and is connected over a network accessibly to the information providing center 21 and the plurality of information providers 37. The server 22 and the plurality of client machines 23 are connected to the LAN 24, and thus, the phonetic-sound providing system is connected to the information providing center 21, over an outside communication network such as the Internet.

The information providing center 21, as shown by the arrow A1, the provided information such as conversation information or picture-image information which it provides includes a commercial message or the like from the information provider 37. Therefore, as shown by the arrow C1, it gains funds for operating the system from the information provider 37. In addition, the information providing center 21, as shown by the arrow A8, provides the information provider 37 preference statistical data which is produced by processing information on the user's preferences. Thus, as shown by the arrow C2, it gains funds for operating the system. Furthermore, as shown by the arrow A7, based on the transmitted information on the user's preferences, the information providing center 21 provides selected provided information to the user, as shown by the arrow A2.

As shown by the arrow A2, the provided information provided to the server 22 is stocked in the server 22, in the same way as the first embodiment. Then, as shown by the arrow A3, it is sent to the client machine 23 which holds a conversation based on a conversation file. The client machine 23, as shown by the arrow A4, sends preference information such as the user's responses to the server 22. Then, as shown by the arrow A4, if the server 22 judges that the preference information transmitted to the user may be provided to the information providing center 21, as shown by the arrow A7, the preference information is sent from the server 22 to the information providing center 21.

The information providing center 21 statistically processes the preference information collected from each user to produce preference statistical data. It makes a user name anonymous, and as shown by the arrow A8, provides the preference statistical data to each information provider 37 and charges for it. As a result, the information providing center 21 collects a data-provision rate for the preference statistical data, as shown by the arrow C2, from each information provider 37. Herein, the information providing center 21 may be a function held by a provider or the like.

The information provider 37 is a manufacturer or retailer. It distributes provided information through the information providing center 21, especially to the users who need it. This helps it unerringly provide information to users. In addition, the information provider 37 distributes the provided information, and at the same time, as shown by the arrow C1, it pays the information providing center 21 for information-distribution expenses, according to the quantity of handled information (or the quantity of information provided to the user).

Figure 6:
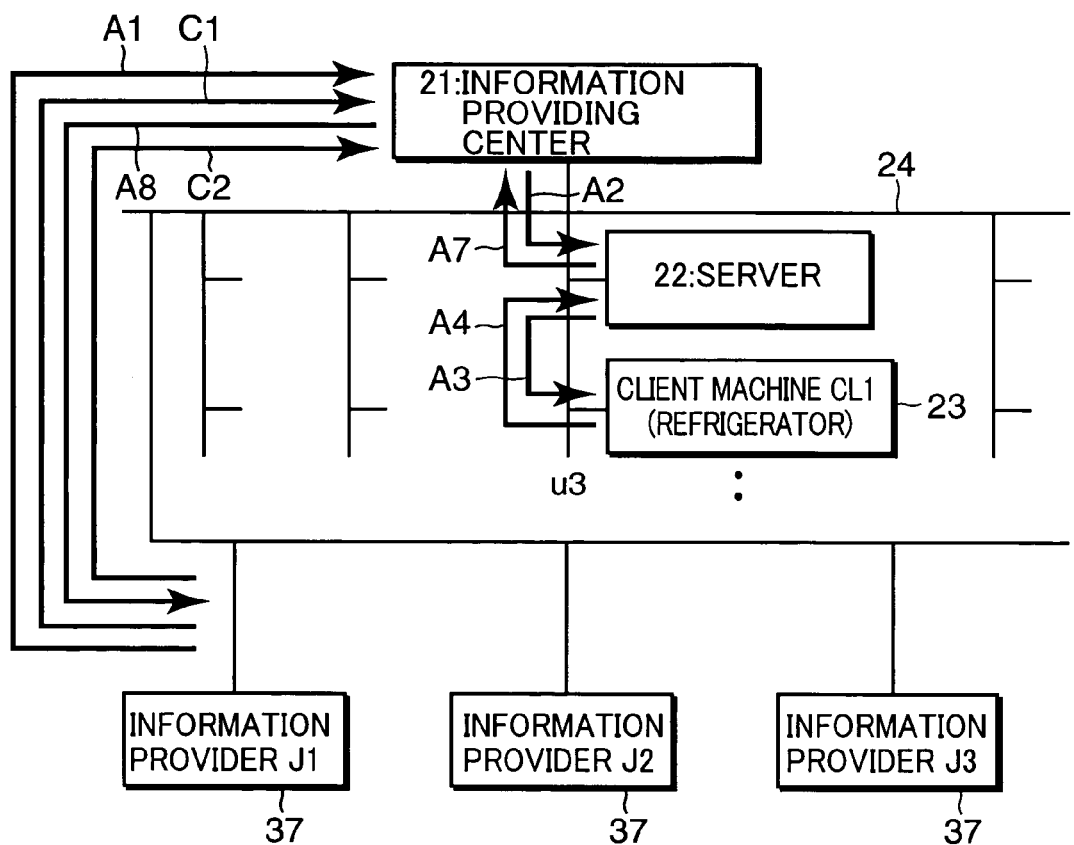
FIG. 6 is a block diagram, showing a phonetic-sound providing system according to a second embodiment of the present invention.
Figure 7:
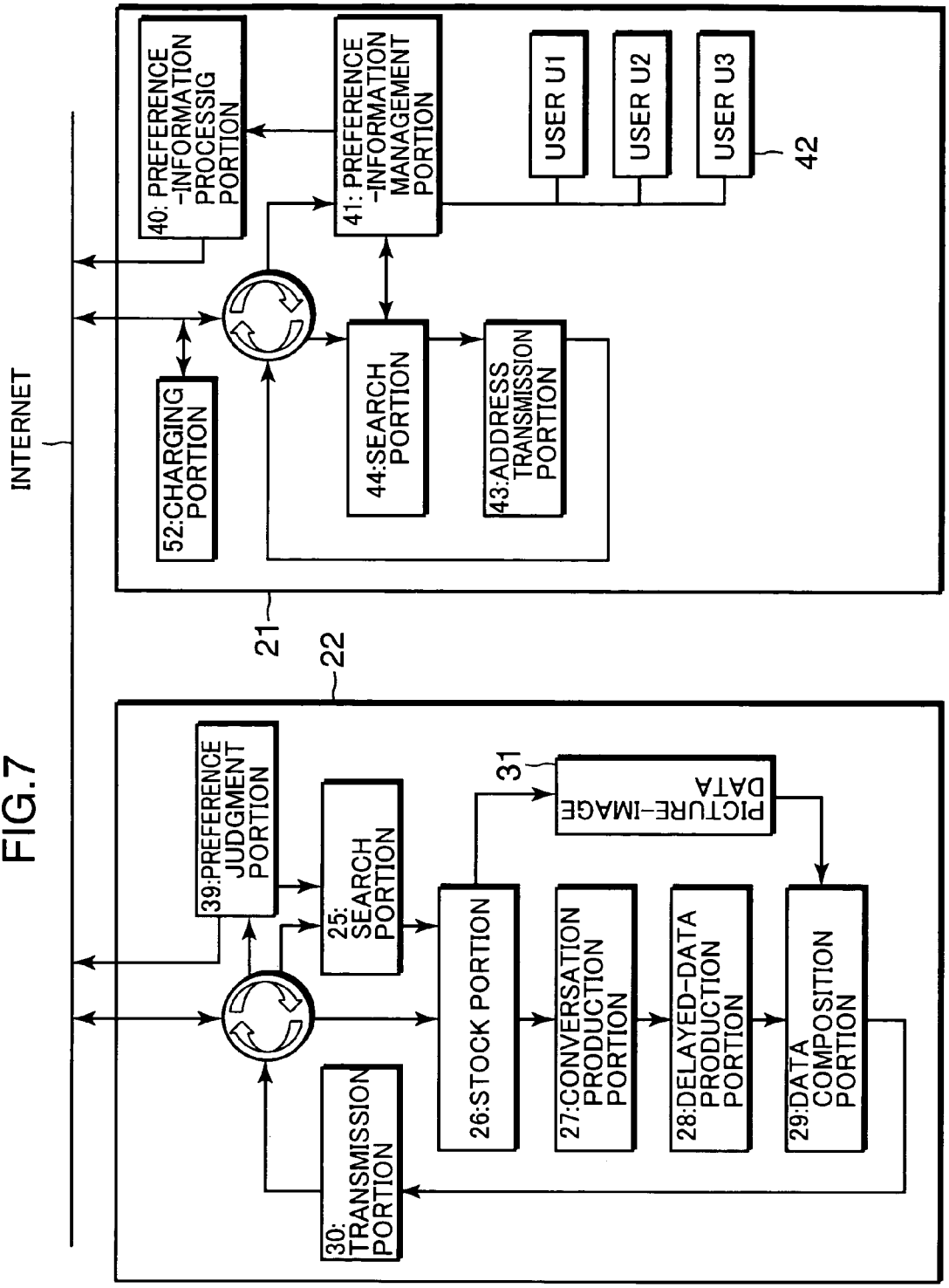
FIG. 7 is a block diagram, showing a main function of the phonetic-sound providing system shown in FIG. 6.
Figure 8:
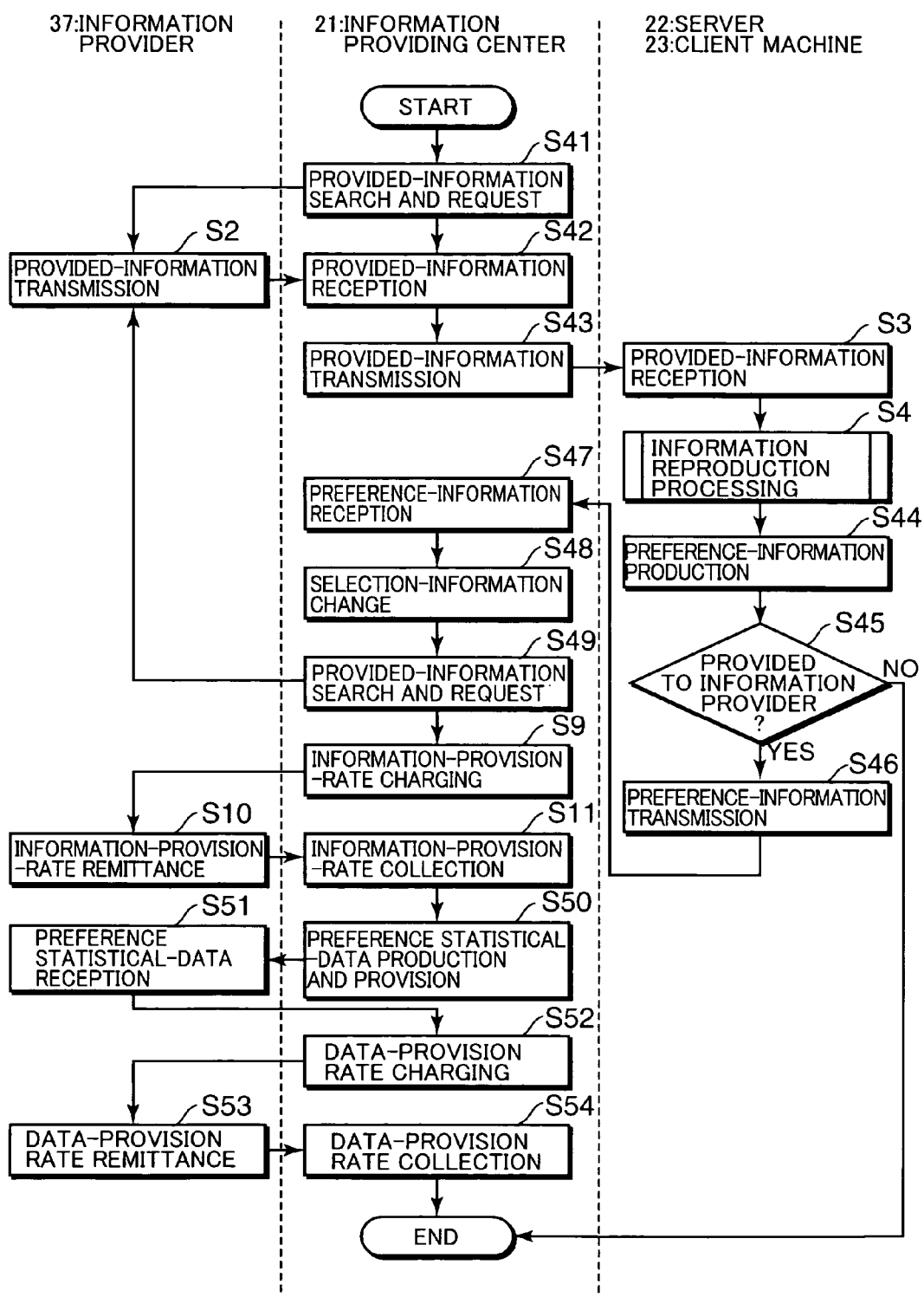
FIG. 8 is a flow chart, showing an example of information-control processing which is executed by the phonetic-sound providing system shown in FIG. 6.

FIG. 7 is a block diagram, showing a main function of the server and the information providing center 21 shown in FIG. 6. Herein, with respect to the client machine 23, the information collection portion 36 of each client machine 23 analyzes and interprets a user's preferences based on user phonetic-sound information and produces preference information which shows the user's preferences. Its other operations are the same as those according to the first embodiment which is shown by FIG. 3, and thus, their description is omitted.

The server 22 has almost the same functions as that according to the first embodiment, but it is provided with no preference analysis portion 38, and instead, with a preference judgment portion 39. This preference judgment portion 39 functions as a user-response information receiving means, a judging means and a user-response information transmitting means. The preference judgment portion 39 receives preference information from each client machine 23, and judges whether the preference information may be sent outside, or whether the user permits the preference information to be sent outside. Then, if it judges that the preference information may be sent outside, it sends it out to the information providing center 21.

The information providing center 21 is made up of: the charging portion 52; in addition to it, a preference-information processing portion 40 which functions as a preference-data producing means, a transmitting means and a rate charging means; a preference-information management portion 41; a preference-information storage portion 42 which stores preference information managed for each user; a search portion 44 which functions as a requesting means and searches information-provider information that corresponds to the user, based on the preference information; and an address transmission portion 43 for sending out, to the server 22 of the user, information or a URL (or a uniform resource locator) from the information provider 37, as a result of the search. Herein, preference statistical data shows a user's preference for merchandise or the like, for example, which is judged based on the result of a questionnaire to the user or the preference information transmitted from the server 22.

Hereinafter, an operation of this system will be described using FIG. 8. FIG. 8 is a flow chart, showing an example of information-control processing which is executed by the phonetic-sound providing system shown in FIG. 6. In FIG. 8, the same reference characters and numerals are given to steps where similar processing is executed to the information-control processing which is executed by the phonetic-sound providing system according to the first embodiment of the present invention shown in FIG. 4.

First, in a step S41, the information managing center 21 requests provided information to the information provider 37, based on selection information. The definitions of these selection information and provided information are the same as those of the phonetic-sound providing system according to the first embodiment. The information provider 37 which receives this provided-information request transmits the provided information to the information providing center 21 (S2). Then, the information providing center 21 receives provided information from the information providing center 21 (S42) and transmits this provided information to the server 22 (S43). Herein, the information managing center 21 requests provided information to the information provider 37 based on selection information, and thus, the kind of provided information shown by the selection information is selected and is provided to the server 22.

In a step S44, in each client machine 23, the information collection portion 36 produces preference information based on user phonetic-sound information. The definitions of these preference information and user phonetic-sound information are the same as those according to the first embodiment. Then, the preference information sent from each client machine is stocked in a preference-information judgment portion 39.

The preference-information judgment portion 39 judges whether the preference information may be sent outside (S45). Herein, the outside represents the outside of the phonetic-sound providing system, specifically, the information providing center 21, the information provider 37 or the like. In the preference-information judgment portion 39, whether it is the preference information which may be sent outside is managed for each information provider 37, and its judgment is made beforehand by a user. For example, the user inputs, in the preference-information judgment portion 39, a keyword of the information which may be sent outside, or a keyword of the information which should not be sent outside, for each information provider. Thus, the preference-information judgment portion 39 judges that the preference information which includes a keyword of the information that may be sent outside is the information which may be sent outside. Or, it judges that the preference information which does not include a keyword of the information that should not be sent outside is the information which may be sent outside.

If preference information is judged to be the information that maybe sent outside (S45; YES), the preference judgment portion 39 transmits, to the information providing center 21, only the preference information which is judged to be the information that may be sent outside (S46). On the other hand, if preference information is not judged to be the information that may be sent outside (S45; NO), then the information-controlling processing is completed.

Next, a preference-information processing scheme in the information managing center 21 will be described. In a step S47, the preference-information management portion 41 receives preference information which is sent from the server 22 of each user, sorts the preference information according to the users, and allows the preference-information storage portion 42 to store it. Next, the information managing center 21 changes selection information based on the preference information (S48). For example, the selection information is a searching keyword, and the preference-information management portion 41 determines the searching keyword based on the preference information. The search portion 44 searches new information (or provided information) which corresponds to the preference of each user, using the changed searching keyword. Then, it requests the information provider 37 (or makes a provided-information request) to provide the provided information which corresponds to this searching result to the server 22 (S49).

After the step S49, the address transmission portion 43 sends out, to the server 22 of each user, a URL of information-provider information on the information provider 37 which undergoes searching and provides provided information. This information-provider information shows an introduction of the information provider 37 which is connected to the server 22. Herein, the preference judgment portion 39 which receives the URL obtains the information-provider information from the received URL. If it receives, for the first time, provided information from the information provider 37 shown by this information-provider information, this new information provider 37 is registered and the conditions for a user's transmissible preference information are inputted. Aiming to prevent a great store of information, the information managing center 21 usually manages only a URL within a site of the information provider 37, and thus, it is not supposed to stock much information from the information provider 37. The server 22 records the URL in the information provider 37, and thus, it can connect with this site and obtains provided information from the information provider 37 without being managed by the information providing center 21.

Further, after the step S49, the preference-information processing portion 40 statistically produces preference statistical data by processing a user's response to commercial-message information on individual pieces of merchandise, based on the preference information of the user which is received by the preference-information management portion 41. Then, it provides the preference statistical data to a person who wants it (S50). The information provider 37 receives the preference statistical data (S51). The preference-information processing portion 40 charges the information provider 37 a data-provision rate for transmitting the preference statistical data (S52). The charged information provider 37 makes a remittance for the data-provision rate to the information providing center 21 (S53). The information providing center 21 collects the data-provision rate (S54). Then, the information-control processing is completed.

This phonetic-sound providing system is characterized in that individual users are not identified by the information provider 37. The information processing center 21 produces preference statistical data based on a request by the information provider 37 and sends it to the information provider 37. Particularly, the information providing center 21 has information on the preference of each user, and thus, for example, it easily obtains information such as the interrelation between "a person who likes a foreign-brand car" and "a person who likes a high-class hotel." As a result, if it statistically finds the fact that many of "the people who like a foreign-brand car" like "a high-class hotel", that makes it possible that the information processing center 21 executes management so that the provided information on a high-class hotel from the information provider 37 can be selectively provided to the user "who likes a foreign-brand car." Furthermore, such statistical data processing for the information on a user's preference helps clarify the following matter. With respect to beer, Sapporo Breweries Ltd. has shipped "Goku-nama" (which is a trademark registered by Sapporo Breweries Ltd.). This is reported to have turned a certain percentage of the regular drinkers of "Hon-nama" (which is a trademark registered by Asahi Breweries, Ltd.) and "Brau" (which is a trademark registered as a sparkling liquor by Sapporo Breweries Ltd.), into "Goku-nama" drinkers. " The statistical data processing could make clear how many percent of the drinkers have changed their preferences.

As described above, the information providing center 21 provides the information obtained by analyzing preference information to the information provider 37. It charges for providing the information and thus gains funds for operating the phonetic-sound providing system. Therefore, the phonetic-sound providing system according to this embodiment has the advantages of the phonetic-sound providing system according to the first embodiment of the present invention. In addition, it has another advantage in gaining more funds for its system operation from the information provider 37 and promoting financial activities of the information provider 37.

Furthermore, the information providing center 21 makes a fixed-point survey by continuously getting and analyzing information on a specific user's preference, so that statistical data on the specific user's preference can be provided to the information provider 37. In this case, the user-identifiable information which is held by the information providing center 21 is not given to the preference statistical data, and thus, an abstract user name such as "a girl A" and "a boy B" is given. Hence, preference information according to ages may also be provided to the information provider.

Furthermore, the preference statistical data may also include the information on the moment when a user shows the greatest interest while the picture file which is provided to the user is reproduced. For example, when a commercial message of Takemoto Shoten Co., Ltd. which purchases used pianos is provided to a user, the sound which has the frequency (of about 200 Hz) that corresponds to a cry of the user's baby cannot be heard. This shows that a certain commercial message has helped the baby stop crying, which may be provided as a piece of information to the information provider.

A user may just respond to the information which is provided, in the same way as according to the first embodiment. Herein, a user permits the provision of preference information to a specific information provider 37, and thus, the user may get a giveaway in return for the provision of preference information, though it does not participate in a prize competition.

Herein, in the phonetic-sound providing system according to this embodiment, each client machine 23 may directly obtain provided information from the information provider 37 (i.e., without the information providing center 21), using a searching function or the like of the search portion 25, in the same way as that according to the first embodiment. In this case, the search portion 25 of the server 22 constantly searches the provided information suitable to information on a user's preference.

Herein, a plurality of information providers 37 may not be necessarily connected, in other words, a single information provider 37 may be connected.

In the phonetic-sound providing system according to a third embodiment of the present invention, the client machine 23 is provided with the data composition portion 29, and thus, delay data is not given to a picture-image file or a phonetic-sound file. In other words, at the time when a conversation is started, or at the time when a conversation file is produced, the transmission portion 30 sends the conversation file to the client machine 23 which holds the conversation. Then, each client machine 23 starts to produce the transmitted file within a predetermined period of time. This is the only point that this system is different from the phonetic-sound providing system according to the first and second embodiments of the present invention.

Figure 9:
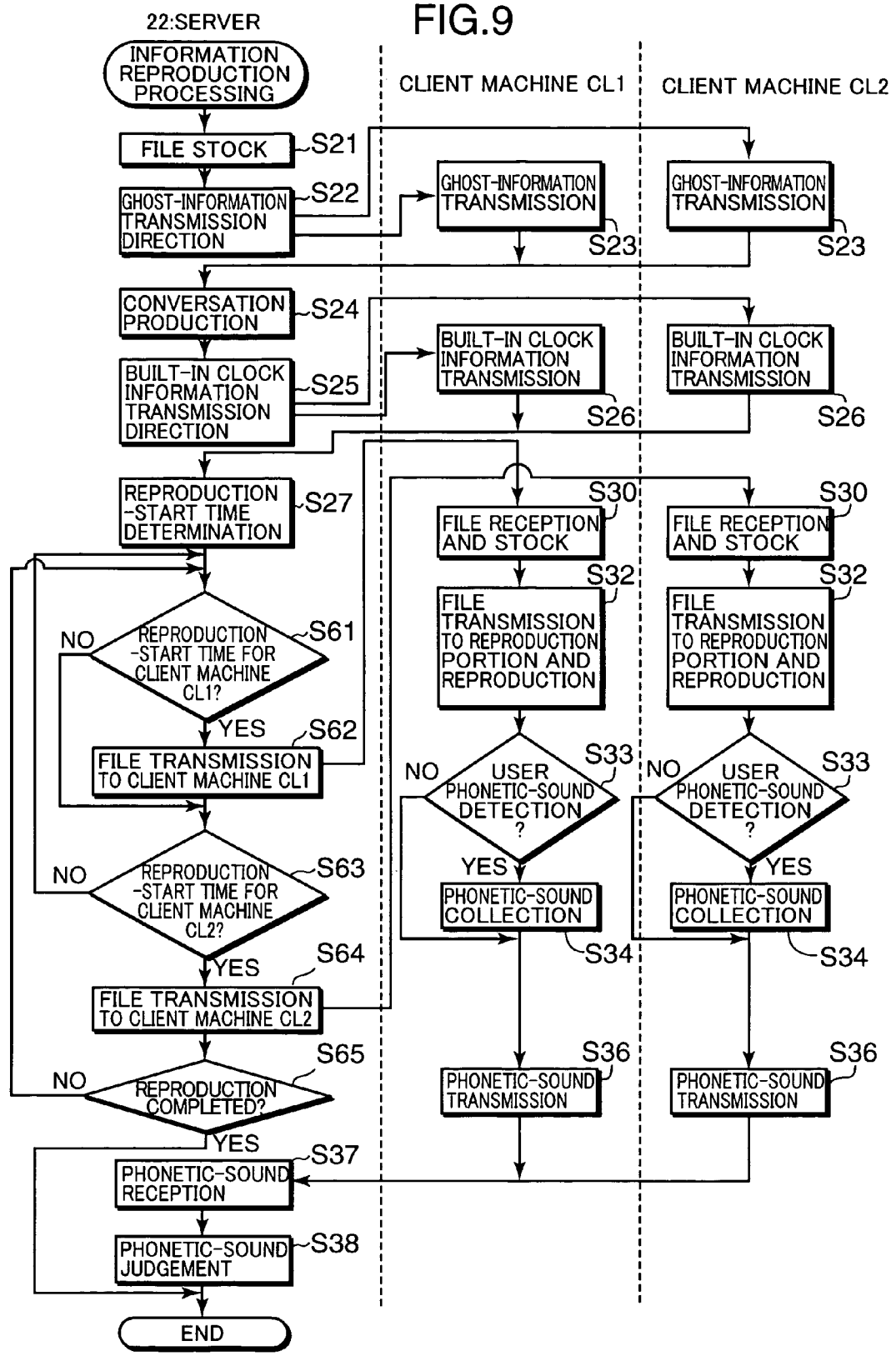
FIG. 9 is a flow chart, showing an example of information-provision processing which is executed by a phonetic-sound providing system according to a third embodiment of the present invention.

This phonetic-sound providing system has the same system configuration and flow of information and funds as those according to the first and second embodiments. However, the phonetic-sound providing system according to this embodiment differs in the timing when a conversation file or a picture-image file is transmitted. In addition, the server 22 is provided with the data composition portion 29. This phonetic-sound providing system is described, using FIG. 3 and FIG. 9 which are shown in the system according to the first embodiment of the present invention. FIG. 9 is a flow chart, showing an example of information-provision processing which is executed by the phonetic-sound providing system according to the third embodiment of the present invention. In FIG. 9, the same reference characters and numerals are given to steps where the same processing is executed to the information-provision processing shown in FIG. 5.

In a step S61, the transmission portion 30 judges whether the time has become the reproduction-start time of a conversation file or a picture-image file which corresponds to the client machine c11, with reference to the reproduction-time timetable produced in the step S27. If it judges the time has become the reproduction-start time of the conversation file or the picture-image file which corresponds to the client machine c11 (S61; YES), the transmission portion 30 transmits the conversation file or the picture-image file to the client machine c11 (S62). If it does not judge the time has become the reproduction-start time of the conversation file or the picture-image file which corresponds to the client machine c11 (S61; NO), then processing in a step S63 is executed.

In the step S63, the transmission portion 30 judges whether the time has become the reproduction-start time of a conversation file or a picture-image file which corresponds to the client machine c12, with reference to the reproduction-time timetable produced in the step S27. If it does not judge the time has become the reproduction-start time of the conversation file or the picture-image file which corresponds to the client machine c12 (S63; NO), then the processing of the step S61 is executed again. If it judges the time has become the reproduction-start time of the conversation file or the picture-image file which corresponds to the client machine c12 (S63; YES), the transmission portion 30 transmits, to the client machine c12, the conversation file or the picture-image file whose reproduction-start time has come (S64).

Then, the reception portion 32 judges whether all conversation files and picture-image files which correspond to the client machine c11 have been transmitted from the server 22 (S65). If it does not judge that all the conversation files and the picture-image files which correspond to the client machine c11 have been transmitted (S65; NO), then the processing of the step S61 is executed again. If it judges that all the conversation files and the picture-image files have been transmitted (S65; YES), then transmitting processing of the conversation files and the picture-image files is completed.

Accordingly, at the reproduction-start time in the client machine c11 and the reproduction-start time in the client machine c12, the conversation files and the picture-image files which have been transmitted at the step S62 or the step S64, respectively, are received at the client machine 23 (S30). Then, the conversation files and the picture-image files which have been received are sent, within a predetermined time, to the phonetic-sound reproduction portion 33 or the picture-image display portion 35, and then they are reproduced (S32).

According to the above described configuration, the conversation files and the picture-image files are transmitted, one after another, to the client machine 23 at the reproduction-start time and then are reproduced. Therefore, the conversation files and the picture-image files start to be reproduced at the time according to the reproduction-start time. Hence, the phonetic-sound providing system according to this embodiment also has the same advantages as those of the phonetic-sound providing system according to the first and second embodiments of the present invention. Furthermore, in the phonetic-sound providing system according to this embodiment, the reproduction timing of conversation files of each client machine 23 can be coordinated, even though the storage capacity of the stock portion 320 of each client machine 23 is not great enough to store a large number of conversation files and picture-image files.

In the phonetic-sound providing system according to the first and second embodiments of the present invention, the data composition portion 29 produces phonetic-sound files which include picture-image files and conversation files. Then, headers are attached to these files to compose data, and all the series of conversation data is sent, almost at the same time, to the corresponding client machine 23 from the transmission portion 30. Each client machine 23 receives all the picture-image files and the conversation files. Then, each conversation file is reproduced at the reproduction-start time shown by the header.

However, the phonetic-sound providing system according to the first and second embodiments of the present invention is suitable for the case where data is transmitted from the server 22 to the client machine 23 at such a low speed that the transmission of picture-image files or phonetic-sound files including conversation files to each client machine 23 has not been completed at the reproduction-start time. In other words, according to this embodiment, conversation files or picture-image files which are transmitted from the server 22 are reproduced one after another. In this method, if data is not transmitted at a high speed from the server 22 to the client machine 23, the following disadvantage may arise. If a large picture-image file is transmitted when a conversation file is reproduced, the picture-image file may not be transmitted in time, thereby generating a break in a conversation between the client machines. Thus, after confirmation is once made that all the conversation files and the picture-image files have been sent on in the stock portion 320 of each client machine 23, the conversation files and the picture-image files are supposed to start being reproduced.

However, the storage capacity of the stock portion 320 of each client machine 23 may not be great enough to store all the conversation files and picture-image files which are transmitted at a time. Especially, information transmitting technology has recently improved, and thus, a phonetic-sound providing system needs to be provided which is capable of providing, to each client machine 23, the picture-image files which exceeds the storage capacity of the stock portion 320 in the client machine 23. Hence, in the phonetic-sound providing system according to this embodiment, picture-image files from the server 22 are transmitted one after another to each client machine 23 in line with the reproduction-start time. This makes it possible that the picture-image files which exceed the storage capacity of the stock portion 320 are provided to the client machine 23.

Herein, in the same way as the phonetic-sound providing system according to the first and second embodiments of the present invention, conversation files are simultaneously distributed to each client machine 23, and only picture-image files are sent from the server to each client machine 23 at a reproduction time and start to reproduce them soon. Such a method may also be used. In this case, if the quantity of handled data is small and the capacity of a stock portion is extremely small, for example, in a client machine such as an electric rice cooker, conversation files may also be sent one after another to the client machine 23 at a reproduction time, as long as the client machine 23 has an extremely small capacity of the stock portion.

Furthermore, according to this embodiment, a judgment is made whether the time is a reproduction-start time in the step S61. However, a judgment may also be made whether the time is a predetermined period of time before the reproduction-start timing. Furthermore, what conversation files or picture-image files are sent soon includes the fact that they are sent a predetermined period of time after the time when the conversation files or picture-image files have been received by the server 22. In other words, they may be sent within the designated predetermined period of time so that the conversation of a conversation file between the client machines 23 could not become unnatural.

Furthermore, according to the present invention, the conversation production portion 27 may not be necessarily provided, in other words, the search portion 25 may receive conversation files, and the conversation files may not be produced in the server 22. Furthermore, according to the present invention, the information provider 37 may not be necessarily charged. A plurality of information providers 37 may be connected to the information providing center 21, and thus, provided information may be received from the plurality of information providers 37. In addition, a plurality of information providing centers 21 may be connected, thereby managing provided information from the plurality of information providing centers 21. Furthermore, according to the present invention, there is no need to receive the provided information managed by the information providing center 21. In other words, provided information may even be obtained through a search of the search portion 25. Furthermore, the phonetic-sound providing system according to the present invention may not pass through the information providing center 21. In other words, it may be connected directly to the information provider 37.

As described above, according to the present invention, the server grasps all the voiced phonetic-sound information (conversation files) reproduced by each client machine 23 and determines the reproduction timing of a plurality of conversation files. Therefore, processing for coordinating the reproduction timing becomes less complicated than in the case where each client machine itself determines the reproduction timing and reproduces the conversation files. This makes it possible to reproduce conversation files of each client machine using relatively simple processing, as if the client machines held a conversation with each other. Accordingly, the voiced phonetic-sound information is converted into a smooth conversation between the client machines. A user can indirectly receive information from the contents of this conversation.

Especially, in the case where a ghost which is a fictitious character of each client machine is allotted to the client machine (or a household electrical appliance or the like), the coordination of reproduction timing becomes complicated. However, according to the present invention, the server coordinates the reproduction timing, thereby taking into account the speed at which each ghost speaks. This allows voiced phonetic-sound information to be converted into a smooth conversation between the client machines which differ in personality. A user can indirectly receive information from the contents of this conversation.

Furthermore, using the server, the reproduction timing according to the ghost of each piece of equipment is given to voiced phonetic-sound information. Then, a series of pieces of voiced phonetic-sound information are transmitted to each ghost, and each client machine reproduces conversation files in the reproduction timing. This prevents the conversation outputted to the client machine from breaking off, more effectively than in the case where pieces of phonetic-sound information is transmitted one by one.

This application is based on Japanese patent application serial No. 2002-106165, filed in Japan Patent Office on Apr. 09, 2002, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A phonetic-sound providing system comprising:
   a server operable to distribute conversation information; and
   a plurality of different kinds of household electric apparatuses in a house, communicably connected to said server, operable to output the conversation information distributed from said server to an only and single user who stays in the house alone;
   said server comprising:
      storage means for storing fictitious personality information indicating characteristics of a personality associated with the household electric appliance, respectively;
      receiving means for receiving text information for producing a conversation between the plurality of household electric appliances, or searching means for searching the Internet and collecting provided information;
      conversation dividing means for dividing the conversation information into a plurality of pieces of voiced phonetic-sound outputted from a plurality of speakers based on the fictitious personality information;
      allotting means for allotting the plurality of pieces of voiced phonetic-sound to each household electric appliance in line with a character of each household electric appliance shown by the fictitious personality information based on the fictitious personality information;
      producing means for producing a conversation file which has the contents of the allotted pieces of voiced phonetic-sound in a way to speak in line with the character of each household electric appliance shown by the fictitious personality information;
      timing determining means for determining an order of an output of the conversation file produced by the producing means, for determining output timing of the conversation file of each of the household electric appliances respectively in accordance with the determined order, and for producing timing information which indicates the determined output timing as if each household electric appliance is having the conversation, by coordinating the output timing of a plurality of conversation files; and
      transmitting means for transmitting the conversation information to respective household electric appliance associated with the conversation information; and
   each of said household electric appliance comprising:
      output means for outputting a phonetic sound as if each household electric appliance is having the conversation in a real world by coordinating the output timing of a plurality of conversation files and arranging the plurality of household electric appliances in an area such that the only-and-single user is allowed to hear the conversation among the household electric appliances, so that the user is provided with the information indirectly.

2. The phonetic-sound providing system according to claim 1, wherein:
   said transmitting means transmits the conversation information and the timing information corresponding to each piece of conversation information.

3. The phonetic-sound providing system according to claim 1, wherein:
   said timing determining means determines output timing of the conversation file, and transmits the conversation file to said transmitting means in accordance with the output timing.

4. The phonetic-sound providing system according to claim 1, wherein:
   said searching means searches for and collects picture-image information, using a tag given to the picture-image information which indicates the contents of the picture-image information;
   said producing means produces the conversation information using said tag; and
   said transmitting means transmits the picture-image information.

5. The phonetic-sound providing system according to claim 1, further comprising: an information-provision managing server operable to manage the provision of information given by an information providing server, wherein said receiving means is communicably connected to said information-provision managing server and receives the text information via said receiving means;
   said server further comprising:
      user-phonetic-sound receiving means for receiving, from said household electric appliances, user-phonetic-sound information which is collected while the conversation information is output and for a predetermined period after the conversation information is output, the user-phonetic-sound information including the phonetic sound of a user who uses said household electric appliances;
      analyzing means for analyzing a response of the user based on the received user-phonetic-sound information; and
      an information transmitting means for transmitting user response information which indicates the analyzed user response to the information-provision managing server, wherein said receiving means receives the text information which is selected based on the user response information by the information-provision managing server.

6. The phonetic-sound providing system according to claim 1, said server further comprising:
   user-phonetic-sound receiving means for receiving, from said household electric appliances, user-phonetic-sound information which is collected while the conversation information is output and for a predetermined period after the conversation information is output, the user-phonetic-sound information including the phonetic sound of a user who uses said household electric appliances; and
   analyzing means for analyzing a response of the user based on the received user-phonetic-sound information;
   wherein said searching means lowers the frequency of searches for provided information of the same kind as the provided information upon which the conversation information is based if the analyzed user response to the conversation information based on the provided information is a negative response.

7. The phonetic-sound providing system according to claim 1, said server further comprising:
   user-phonetic-sound receiving means for receiving, from said household electric appliances, user-phonetic-sound information which is collected while the conversation information is output and for a predetermined period after the conversation information is output, the user-phonetic-sound information including the phonetic sound of a user who uses said household electric appliances; and
   analyzing means for analyzing a response of the user based on the received user-phonetic-sound information;
   wherein said searching means increases the frequency of searches for provided information of the same kind as the provided information upon which the conversation information is based if the analyzed user response to the conversation information based on the provided information is a positive response.

8. The phonetic-sound providing system according to claim 1, further comprising: an information-provision managing server operable to manage the provision of information given by an information providing server, wherein said receiving means is communicably connected to said information-provision managing server and receives the text information via said receiving means;
   said server further comprising:
      user-response information receiving means for receiving, from said plurality of household electric appliances, user response information indicating the response of a user while the conversation information is output or for a predetermined period after the conversation information is output;
      judging means for judging whether the user permits the transmission of the received user response information to the information-provision managing server; and
      user-response information transmitting means for transmitting only the user response information whose transmission is judged to be permitted by said judging means, to the information-provision managing server,
   wherein said receiving means receives the text information which is selected based on the user response information by the information-provision managing server.

9. A server, for transmitting conversation information to a plurality of different kinds of household electric apparatuses in a house, said server comprising:
   storage means for storing fictitious personality information indicating characteristics of a personality associated with the plurality of household electric appliances, respectively;
   receiving means for receiving text information for producing a conversation between the plurality of household electric appliances, or searching means for searching the Internet and collecting provided information;
   conversation dividing means for dividing the conversation information into a plurality of pieces of voiced phonetic-sound outputted from a plurality of speakers based on the fictitious personality information;
   allotting means for allotting the plurality of pieces of voiced phonetic-sound to each household electric appliance in line with a character of each household electric appliance shown by the fictitious personality information based on the fictitious personality information;
   producing means for producing a conversation file which has the contents of the allotted pieces of voiced phonetic-sound in a way to speak in line with the character of each household electric appliance shown by the fictitious personality information;
   timing determining means for determining an order of an output of the conversation file produced by the producing means, for determining output timing of the conversation file of each of the household electric appliances respectively in accordance with the determined order, and for producing timing information which indicates the determined output timing as if each household electric appliance is having the conversation, by coordinating the output timing of a plurality of conversation files; and
   transmitting means for transmitting the conversation information to respective household electric appliances associated with the conversation information;
   wherein said conversation information is prepared for outputting a phonetic sound as if each household electric appliance is having the conversation in a real world by coordinating the output timing of a plurality of conversation files and arranging the plurality of household electric appliances in an area such that the only-and-single user is allowed to hear the conversation among the household electric appliances, so that the user is provided with the information indirectly.

10. A phonetic-sound output method, for use with a server operable to distribute conversation information and a plurality of different kinds of household electric apparatuses in a house, communicably connected to said server, operable to output the conversation information distributed from the server to a user, said method comprising:
   storing, in the server, fictitious personality information indicating characteristics of a personality associated with the plurality of household electric appliances, respectively;
   receiving, by the server, text information for producing a conversation between the plurality of household electric appliances, or searching, by the server, the Internet and collecting provided information by the server;
   dividing, by the server, the conversation information into a plurality of pieces of voiced phonetic-sound outputted from a plurality of speakers based on the fictitious personality information;
   allotting, by the server, the plurality of pieces of voiced phonetic-sound to each household electric appliance in line with a character of each household electric appliance shown by the fictitious personality information based on the fictitious personality information;
   producing, by the server, a conversation file which has the contents of the allotted pieces of voiced phonetic-sound in a way to speak in line with the character of each client machine shown by the fictitious personality information;
   determining, by the server, an order of an output of the conversation file produced by the producing means, determining, by the server, output timing of the conversation file of each of the household electric appliances respectively in accordance with the determined order, and producing, by the server, timing information which indicates the determined output timing as if each client machine is having the conversation, by coordinating the output timing of a plurality of conversation files; and
   transmitting, by the server, the conversation information to respective household electric appliances associated with the conversation information; and
   outputting, in each respective household electric appliance, a phonetic sound as if each household electric appliance is having the conversation in a real world by coordinating the output timing of a plurality of conversation files and arranging the plurality of household electric appliances in an area such that the only-and-single user is allowed to hear the conversation among the household electric appliances, so that the user is provided with the information indirectly.

11. A computer readable storage medium storing a phonetic sound output computer program, for use with a server operable to distribute conversation information and a plurality of different kinds of household electric apparatuses in a house, communicably connected to said server, operable to output the conversation information distributed from the server to a user, said program operable to cause the server and the household electric appliances to perform a method comprising:

storing, in the server, fictitious personality information indicating characteristics of a personality associated with the plurality of household electric appliances, respectively;

receiving, by the server, text information for producing a conversation between the plurality of household electric appliances, or searching, by the server, the Internet and collecting provided content information by the server;

dividing, by the server, conversation information into a plurality of pieces of voiced phonetic-sound outputted from a plurality of speakers based on the fictitious personality information;

allotting, by the server, the plurality of pieces of voiced phonetic-sound to each household electric appliances in line with a character of each client machine shown by the fictitious personality information based on the fictitious personality information;

producing, by the server, a conversation file which has the contents of the allotted pieces of voiced phonetic-sound in a way to speak in line with the character of each household electric appliances shown by the fictitious personality information;

determining, by the server, an order of an output of the conversation file produced by the producing means, determining, by the server, output timing of the conversation file of each of the household electric appliances respectively in accordance with the determined order, and producing, by the server, timing information which indicates the determined output timing as if each household electric appliances is having the conversation, by coordinating the output timing of a plurality of conversation files; and transmitting, by the server, the conversation information to respective client machines associated with the conversation information; and outputting, in each respective household electric appliance, a phonetic sound as if each household electric appliance is having the conversation in a real world by coordinating the output timing of a plurality of conversation files and arranging the plurality of household electric appliances in an area such that the only-and-single user is allowed to hear the conversation among the household electric appliances, so that the user is provided with the information indirectly.

* * * * *